(12) United States Patent  
Yasuda et al.

(10) Patent No.: US 12,226,918 B2  
(45) Date of Patent: Feb. 18, 2025

(54) TRANSPORT SYSTEM, CONTROL METHOD FOR TRANSPORT SYSTEM, AND NON-TRANSITORY COMPUTER-READABLE MEDIUM FOR TRANSPORT SYSTEM

(71) Applicant: DMG MORI CO., LTD., Nara (JP)

(72) Inventors: Hiroshi Yasuda, Nara (JP); Tomoaki Yoda, Nara (JP); Shinya Yamaoka, Nara (JP); Shigenobu Ota, Nara (JP)

(73) Assignee: DMG MORI CO., LTD., Nara (JP)

( * ) Notice: Subject to any disclaimer, the term of this patent is extended or adjusted under 35 U.S.C. 154(b) by 219 days.

(21) Appl. No.: 18/018,556

(22) PCT Filed: Mar. 25, 2021

(86) PCT No.: PCT/JP2021/012529  
§ 371 (c)(1),  
(2) Date: Jan. 28, 2023

(87) PCT Pub. No.: WO2022/024455  
PCT Pub. Date: Feb. 3, 2022

(65) Prior Publication Data  
US 2024/0033931 A1 Feb. 1, 2024

(30) Foreign Application Priority Data  
Jul. 28, 2020 (JP) .................... 2020-127164

(51) Int. Cl.  
*B25J 9/16* (2006.01)  
*B25J 5/02* (2006.01)  
(Continued)

(52) U.S. Cl.  
CPC ............... *B25J 9/1697* (2013.01); *B25J 5/02* (2013.01); *B25J 19/023* (2013.01); *G05B 19/41815* (2013.01); *G05B 2219/40272* (2013.01)

(58) Field of Classification Search  
CPC .......... B25J 9/1697; B25J 5/02; B25J 19/023; G05B 19/41815; G05B 2219/40272;  
(Continued)

(56) References Cited

U.S. PATENT DOCUMENTS

2006/0184013 A1    8/2006   Emanuel et al.  
2014/0067109 A1    3/2014   Kawai  
(Continued)

FOREIGN PATENT DOCUMENTS

JP    2002-166340 A    6/2002  
JP    2008-112294 A    5/2008  
(Continued)

*Primary Examiner* — Abby Y Lin  
*Assistant Examiner* — Dylan M Katz  
(74) *Attorney, Agent, or Firm* — IP Business Solutions, LLC

(57) ABSTRACT

Provided is a technique of transporting an object to be transported to a machine tool more securely. A transport system includes a transport path, and a storage portion. The storage portion stores an object, and has a first reference shape. The transport system includes machine tools, and a transport device that moves on and the transport path and transports an object. The control unit executes a process of making a camera photograph the first reference shape to acquire a first image from the camera, and a process of correcting a control parameter to be used in transporting an object to be transported stored in the storage portion to the machine tool that is a transport destination on the basis of a position of the first reference shape in the first image.

6 Claims, 22 Drawing Sheets

(51) Int. Cl.
*B25J 19/02* (2006.01)
*G05B 19/418* (2006.01)

(58) Field of Classification Search
CPC ........... G05B 2219/31266; G05B 2219/31267;
G05B 2219/31268; G05B 2219/45045;
G05B 2219/50362; G05B 19/4189; Y02P
90/02
See application file for complete search history.

(56) References Cited

U.S. PATENT DOCUMENTS

2018/0057261 A1    3/2018  Takagawa et al.
2022/0089376 A1    3/2022  Nakamura et al.

FOREIGN PATENT DOCUMENTS

JP          6688912 B1     4/2020
KR       102142663 B1 *  8/2020

* cited by examiner

FIG.10
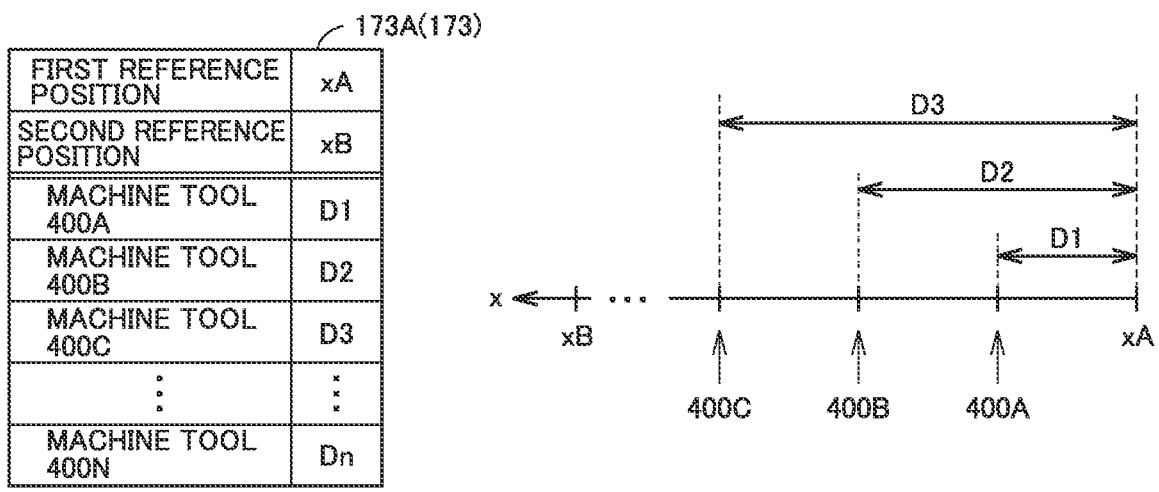
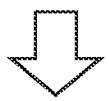
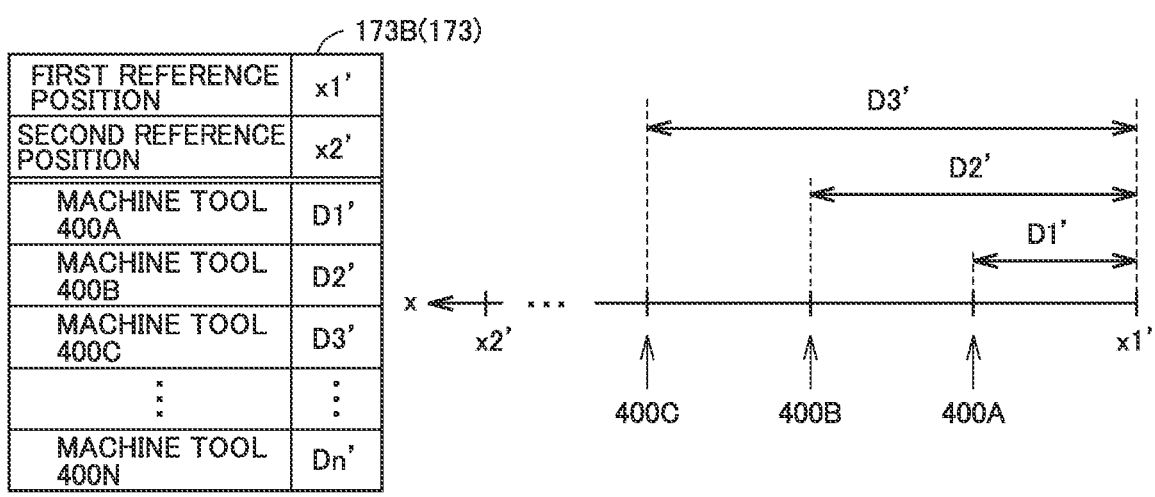

| STORAGE PLACE | COORDINATES | TOOL | STATE | RESIDUAL SERVICE LIFE |
|---|---|---|---|---|
| 0001 | $x_1, z_1$ | T1001 | NORMAL | 1800 MIN./ 2000 MIN. |
| 0002 | $x_2, z_2$ | T1002 | SERVICE LIFE ALERT | 100/1000 MIN. |
| 0003 | $x_3, z_3$ | T1003 | SERVICE LIFE | 0 |
| 0004 | $x_4, z_4$ | — | VACANT | — |
| ⋮ | ⋮ | ⋮ | ⋮ | ⋮ |

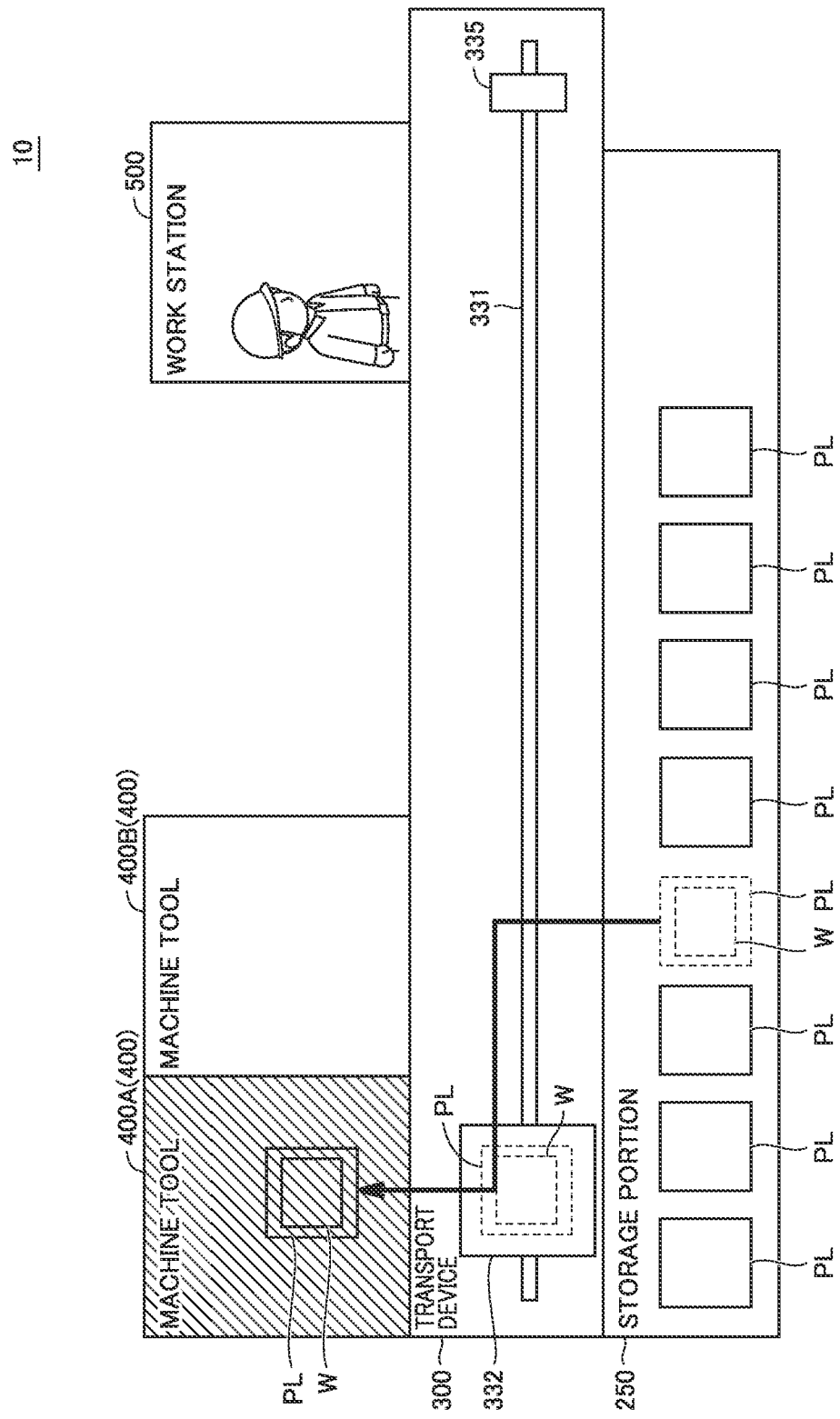

TRANSPORT SYSTEM, CONTROL METHOD FOR TRANSPORT SYSTEM, AND NON-TRANSITORY COMPUTER-READABLE MEDIUM FOR TRANSPORT SYSTEM

TECHNICAL FIELD

The present disclosure relates to transport control of an object to be transported in a transport system.

BACKGROUND ART

In recent years, development of a transport system capable of automatically transporting an object to be transported such as a workpiece or a tool to a designated machine tool is advanced. PTL 1 (Japanese Patent No. 6688912) discloses a pallet transport system capable of automatically transporting a workpiece to a designated machine tool.

CITATION LIST

Patent Literature

PTL 1: Japanese Patent No. 6688912

SUMMARY OF INVENTION

Technical Problem

A transport system includes a transport device that moves on a transport path. The transport device transports an object to be transported to a designated machine tool by moving on a transport path. It is sometimes the case that the length of the transport path is influenced by environment changes. For such a case, a technique for transporting an object to be transported to a designated machine tool more reliably is desired. PTL 1 is not intended to respond to environment changes.

Solution to Problem

In one example of the present disclosure, the transport system includes a transport path, and a storage portion disposed along the transport path. The storage portion stores an object to be transported that is to be used in machining a workpiece, and has a first reference shape at a predetermined site of the storage portion. The transport system includes a plurality of machine tools, and a transport device that moves on the transport path and transports an object to be transported stored in the storage portion to a machine tool that is a transport destination among the plurality of machine tools. The transport device is provided with a camera. The transport system includes a control unit that controls the transport device. The control unit executes a process of making the camera photograph the first reference shape by moving the transport device to a predetermined first position on the transport path to acquire a first image from the camera, and a process of correcting a control parameter to be used in transporting an object to be transported stored in the storage portion to the machine tool that is a transport destination on the basis of a position of the first reference shape in the first image.

In one example of the present disclosure, the storage portion has a second reference shape at a site different from the aforementioned predetermined site in the storage portion from. The control unit further executes a process of making the camera photograph the second reference shape by moving the transport device to a predetermined second position on the transport path to acquire a second image from the camera. In the process of correcting a control parameter, not only the position of the first reference shape in the first image, but also a position of the second reference shape in the second image is further used.

In one example of the present disclosure, the storage portion has the first reference shape within a range of a predetermined distance from one end of the storage portion in a direction parallel with the transport path, and has the second reference shape within a range of a predetermined distance from the other end of the storage portion in the direction parallel with the transport path.

In one example of the present disclosure, the control parameter is a parameter regarding movement of the transport device in the direction parallel with the transport path.

In one example of the present disclosure, the transport device includes a carriage that moves on the transport path, and a robot attached on the carriage. The control parameter includes at least one of a parameter for controlling movement of the carriage, and a parameter for controlling driving of the robot.

In one example of the present disclosure, the object to be transported is a tool for machining a workpiece, or a pallet to which a workpiece can be attached.

In other example of the present disclosure, there is provided a control method for a transport system. The transport system includes a transport path, and a storage portion disposed along the transport path. The storage portion stores an object to be transported that is to be used in machining a workpiece, and has a first reference shape at a predetermined site of the storage portion. The transport system further includes a plurality of machine tools, and a transport device that moves on the transport path and transports an object to be transported stored in the storage portion to a machine tool that is a transport destination among the plurality of machine tools. The transport device is provided with a camera. The control method includes making the camera photograph the first reference shape by moving the transport device to a predetermined first position on the transport path to acquire a first image from the camera, and correcting a control parameter to be used in transporting an object to be transported stored in the storage portion to the machine tool that is a transport destination on the basis of a position of the first reference shape in the first image.

In other example of the present disclosure, there is provided a control program for a transport system. The transport system includes a transport path, and a storage portion disposed along the transport path. The storage portion stores an object to be transported that is to be used in machining a workpiece, and has a first reference shape at a predetermined site of the storage portion. The transport system further includes a plurality of machine tools, and is configured to move on the transport path. A transport device that transports an object to be transported stored in the storage portion to a machine tool that is a transport destination among the plurality of machine tools is included. The transport device is provided with a camera. The control program causes the transport system to execute making the camera photograph the first reference shape by moving the transport device to a predetermined first position on the transport path to acquire a first image from the camera, and correcting a control parameter to be used in transporting an object to be transported stored in the storage portion to the machine tool that is a transport destination on the basis of a position of the first reference shape in the first image.

The foregoing and other objects, features, aspects and advantages of the present disclosure will become more apparent from the following detailed description of the present disclosure when taken in conjunction with the accompanying drawings.

BRIEF DESCRIPTION OF DRAWINGS

FIG. 10 is a chart schematically showing a correcting process of a control parameter by a correcting section.

FIG. 14 is a chart showing one example of data structure of tool information.

FIG. 22 is a diagram showing a transport system as a pallet transport system.

DESCRIPTION OF EMBODIMENTS

Figure 1:
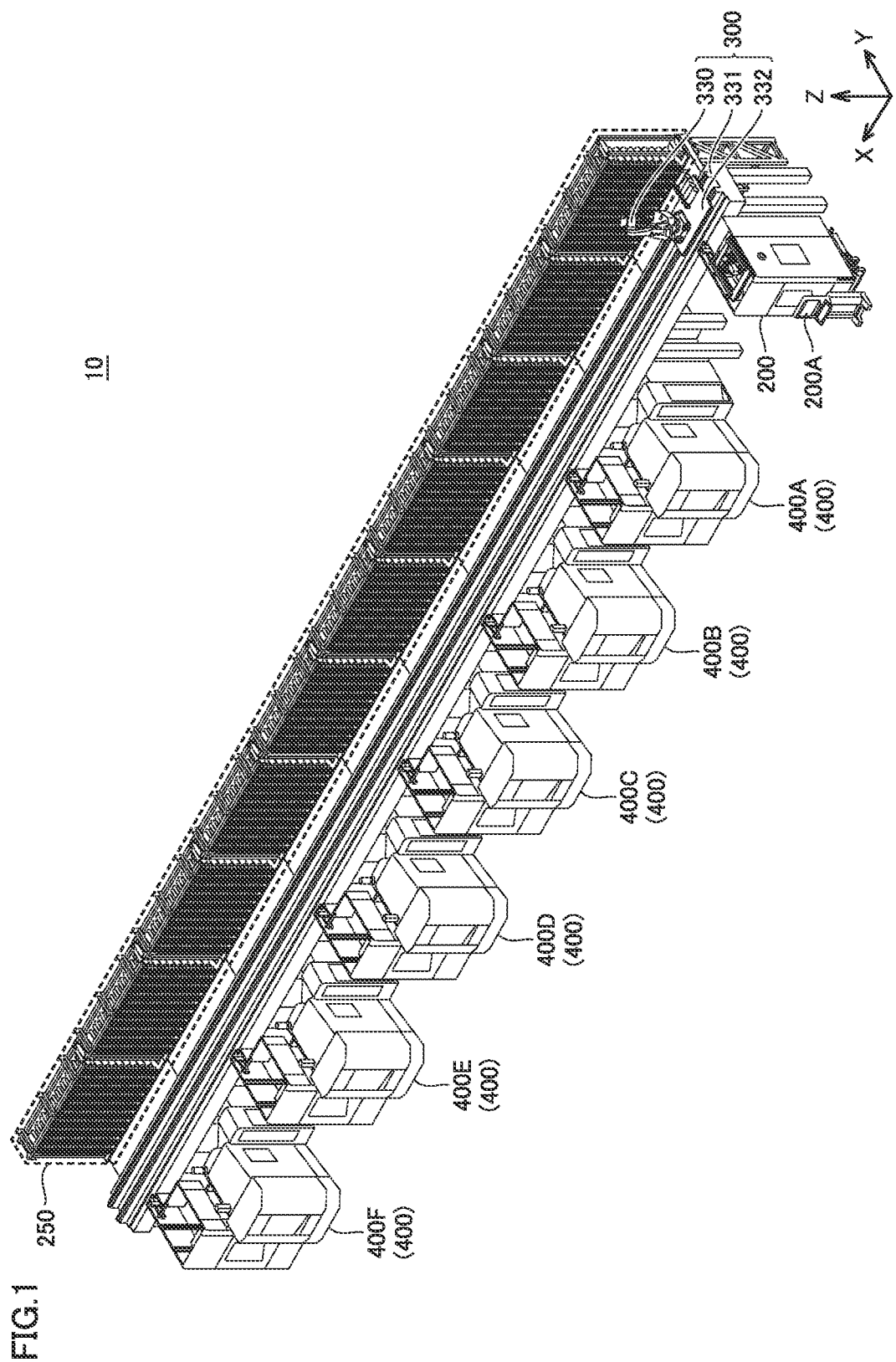
FIG. 1 is a view showing an appearance of a transport system.

Hereinafter, each embodiment according to the present invention will be described by referring to the drawings. In the following description, the same parts and constituents are denoted by the same reference numeral. The names and functions of these are also the same. Therefore, detailed description is not repeated for these. Each embodiment and each modified example described below may be appropriately and selectively combined.

A. APPEARANCE OF TRANSPORT SYSTEM 10

Referring to FIG. 1, a transport system 10 is described. FIG. 1 is a view showing an appearance of transport system 10.

Hereinafter, description is made for a tool transport system as one example of transport system 10, however, transport system 10 is not limited to the tool transport system. As one example, transport system 10 may be a pallet transport system and may be other transport system having the function of transporting an object to be transported that is to be used in machining a workpiece to a machine tool.

As shown in FIG. 1, transport system 10 includes a tool setup device 200, a storage portion 250, a transport device 300, and a machine tool 400.

The "transport device" referred in the present description is a concept including various devices having the function of transporting an object to be transported such as a workpiece or a tool. Hereinafter, description is made for a four to seven-axis driven multi joint robot as one example of transport device 300, however, transport device 300 is not limited to the multi joint robot. As one example, transport device 300 may be a two to three-axis driven orthogonal robot (autoloader), and may be a transport device that automatically transports an object to be transported to machine tool 400 in accordance with a predetermined schedule.

Also, "machine tool" referred in the present description is concept including various devices having the function of machining a workpiece. Machine tool 400 may be a horizontal type machining center, and may be a vertical type machining center. Alternatively, machine tool 400 may be a lathe, may be an additive machine tool, and may be other cutting tool or a grinding tool.

Hereinafter, for convenience of description, the direction corresponding to the moving direction of transport device 300 is defined as "X direction". X direction is one direction of horizontal direction. The direction orthogonal to the X direction is defined as "Y direction". Y direction is one direction of horizontal direction. Also, the direction orthogonal to both of X direction and Y direction is defined as "Z direction". "Z direction" is a vertical direction (gravity direction).

Tool setup device 200 is one of transport destinations for tool by transport device 300. Tool setup device 200 includes an operation terminal 200A. Operation terminal 200A receives various operations to transport system 10.

Storage portion 250 is one of transport destinations for tool by transport device 300. A plurality of tools can be stored in storage portion 250.

Transport device 300 includes an arm robot 330, a rail 331 (transport path), and a carriage 332. Arm robot 330 is fixed on carriage 332. Carriage 332 is configured to be movable along rail 331. Storage portion 250 and machine tool 400 are arranged along rail 331 to sandwich rail 331 therebetween. Transport device 300 is configured to transport a tool between tool setup device 200 and storage portion 250, and is configured to transport a tool between storage portion 250 and machine tool 400.

Machine tool 400 is one of transport destinations for tool by transport device 300. While FIG. 1 shows six machine tools 400A to 400F as machine tool 400, the number of machine tool 400 provided in transport system 10 may be one or more. Machine tool 400 machines a workpiece using a designated tool in accordance with a Machining Program Designed in Advance.

B. DRIVING MECHANISM OF TRANSPORT SYSTEM 10

Figure 2:
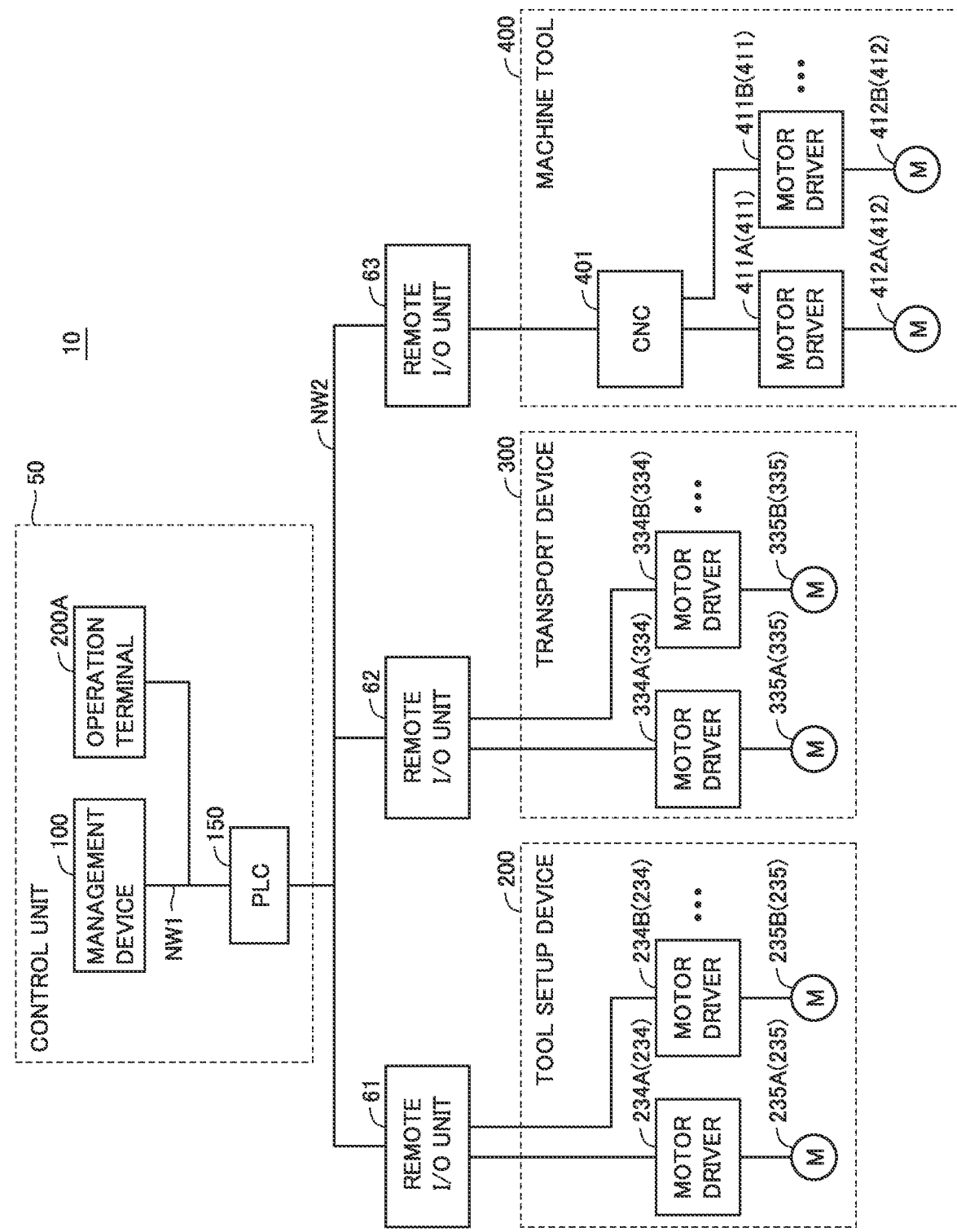
FIG. 2 is a diagram showing a configuration example of a driving mechanism of the transport system.

Next, referring to FIG. 2, various driving mechanisms in transport system 10 are described. FIG. 2 is a diagram showing a configuration example of a driving mechanism of transport system 10.

As shown in FIG. 2, transport system 10 includes a control unit 50, remote I/O (Input/Output) units 61 to 63, tool setup device 200, transport device 300, and machine tool 400.

"Control unit 50" referred in the present description means a device that controls transport system 10. A device configuration of control unit 50 is appropriate. Control unit 50 may be configured by a single control unit and may be configured by a plurality of control units. In the example of FIG. 2, control unit 50 is configured by a management device 100, a PLC 150, and operation terminal 200A described above.

Management device 100 is a main computer that manages transport system 10. PLC 150 controls various industrial devices for automating a machining process. Operation terminal 200A is a terminal for receiving various operations regarding carry-out and carry-in of tool.

Management device 100, PLC 150, and operation terminal 200A are connected to a network NW1. Management device 100, PLC 150, and operation terminal 200A may be communication connected by wire and may be communication connected wirelessly. For Network NW1, EtherNET (registered trademark) or the like is employed. Management device 100 and operation terminal 200A send a control command to PLC 150 via network NW1. According to the control command, a tool to be transported, a transport destination of the tool, start/stop of transport of the tool and the like are designated.

Remote I/O units 61 to 63 and PLC 150 are connected to network NW2. As network NW2, it is preferred to employ a field network that conducts fixed-cycle communication with which data arrival time is ensured. As such a field network that conducts fixed-cycle communication, for example, EtherCAT (registered trademark), EtherNet/IP (registered trademark), CC-Link (registered trademark), or CompoNet (registered trademark) is employed.

Tool setup device 200 includes one or more motor driver 234, and one or more motor 235. In the example of FIG. 2, two motor drivers 234A, 234B and two motors 235A, 235B are shown.

Inside tool setup device 200 or in the vicinity of tool setup device 200, remote I/O unit 61 is disposed. Remote I/O unit 61 mediates data exchange between various driving units (for example, motor driver 234) inside tool setup device 200, and PLC 150. As one example, motor driver 234 receives a control command at a fixed cycle from PLC 150 via remote I/O unit 61, and controls driving of motor 235 according to the control command.

Motor 235A controls, for example, driving of a later-described magazine M1 (see FIG. 13). Motor 235B controls, for example, driving of a later-described magazine M2 (see FIG. 13).

Motor driver 234 may be, for example, a driver for servo motor, and may be a driver for stepping motor. Motor 235 may be, for example, a servo motor, and may be a stepping motor.

Transport device 300 includes one or more motor driver 334, and one or more motor 335. In the example of FIG. 2, two motor drivers 334A, 334B and two motors 335A, 335B are shown.

Inside transport device 300 or in the vicinity of transport device 300, remote I/O unit 62 is disposed. Remote I/O unit 62 mediates data exchange between various driving units (for example, motor driver 334) inside transport device 300, and PLC 150. As one example, motor driver 334 receives a control command at a fixed cycle from PLC 150 via remote I/O unit 62, and controls driving of motor 335 according to the control command.

Motor 335A controls, for example, driving of carriage 332 (see FIG. 1) described above. Motor 335B controls, for example, driving of arm robot 330 (see FIG. 1). Motor 335B is provided in accordance with the number of joints of arm robot 330.

Motor driver 334 may be, for example, a driver for servo motor, and may be a driver for stepping motor. Motor 335 may be, for example, a servo motor, and may be a stepping motor.

Machine tool 400 includes a CNC (Computer Numerical Control) 401, one or more motor driver 411, and one or more motor 412. In the example of FIG. 2, two motor drivers 411A, 411B and two motors 412A, 412B are shown.

Inside machine tool 400 or in the vicinity of machine tool 400, remote I/O unit 62 is disposed. Remote I/O unit 62 mediates data exchange between various driving units (for example, CNC 401) inside machine tool 400, and PLC 150. Likewise motor driver 334, motor driver 411 receives a control command at a fixed cycle from PLC 150 via remote I/O unit 62, and controls driving of motor 412 according to the control command.

Motor 412A drives, for example, a main shaft capable of attachment of a tool in the axial direction of the main shaft. Motor 412B rotationally drives, for example, a main shaft in the rotary direction about the axial direction of the main shaft.

Motor driver 411 may be, for example, a driver for servo motor, and may be a driver for stepping motor. Motor 412 may be, for example, a servo motor, and may be a stepping motor.

C. ARM ROBOT 330

Figure 3:
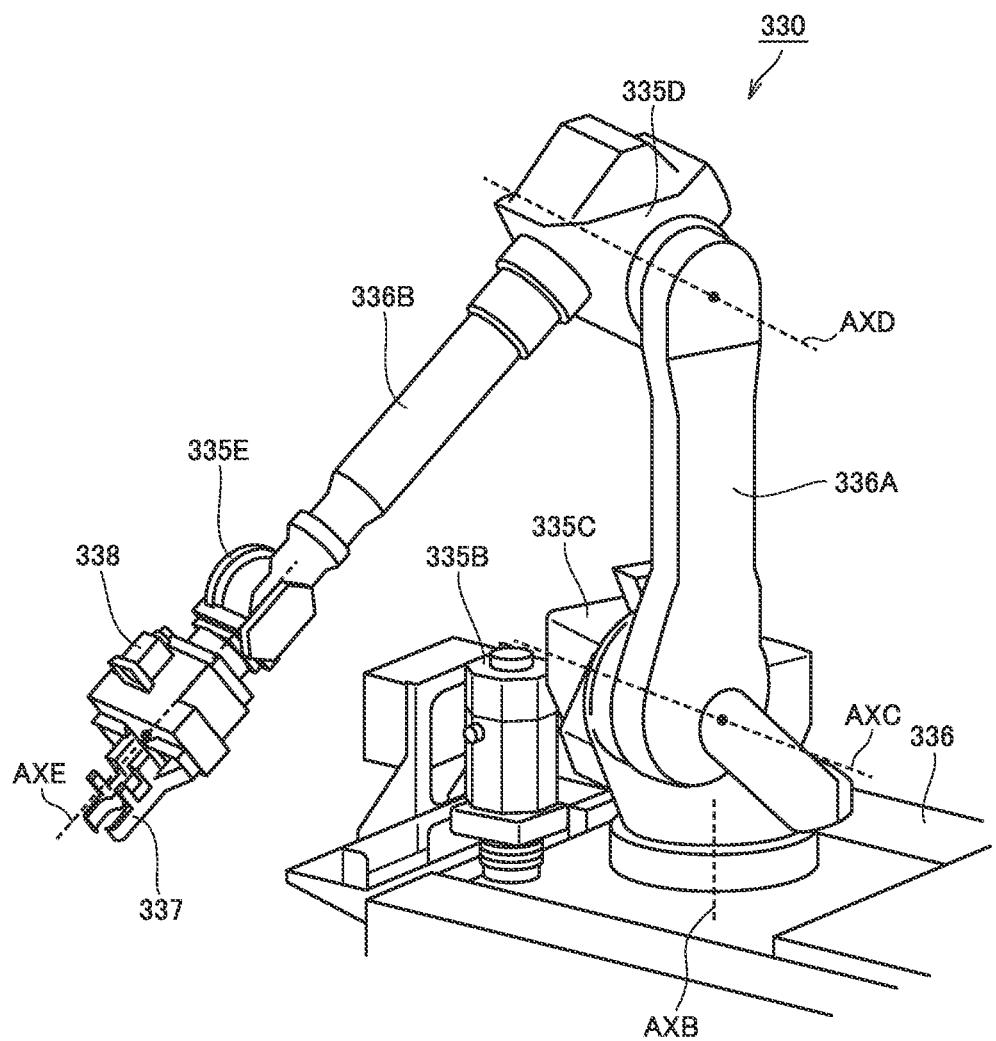
FIG. 3 is a view showing an appearance of an arm robot.

Next, referring to FIG. 3, arm robot 330 is described. FIG. 3 is a view showing an appearance of arm robot 330.

Arm robot 330 is fixed on carriage 332. Arm robot 330 includes motors 335B to 335E, arms 336A, 336B, a pot gripper 337, and a camera 338.

Arm 336A is configured to be drivable by motor 335B in the revolving direction about an axis AXB. Also, arm 336A is configured to be drivable by motor 335C in the revolving direction about an axis AXC.

One end of arm 336B is connected to arm 336A. The other end of arm 336B is connected to pot gripper 337. Arm 336B is configured to be drivable by motor 335D in the revolving direction about an axis AXD. Pot gripper 337 is configured to be drivable by motor 335E in the revolving direction about an axis AXE.

Typically, axis AXB corresponds to a vertical direction. Axis AXC cooperates with revolution of arm 336A about axis AXB in the condition that orthogonality with axis AXB is kept. Axis AXD cooperates with revolution of arm 336A about axis AXC in the condition that the parallel state with axis AXC is kept. Axis AXE cooperates with revolution of arm 336B about axis AXD in the condition that orthogonality with axis AXD is kept.

Pot gripper 337 is a pot gripping mechanism. A pot is a tool storing tool, and stores one tool. That is, pot gripper 337 grips a tool via a pot.

Camera 338 is disposed, for example, on pot gripper 337. Camera 338 is configured to cooperate with driving of arms 336A, 336B and photographs an object located at the tip of pot gripper 337. Camera 338 may be a CCD (Charge Coupled Device) camera, may be an infrared camera (thermography), and may be other type of camera.

D. FUNCTIONAL CONSTITUENTS OF TRANSPORT SYSTEM 10

As described above, carriage 332 moves on rail 331. The length of rail 331 can change under the influence of change in environment such as temperature or humidity and the like. When rail 331 has a length of 30 m, a temperature variation of causes a variation in length of rail 331 of 3 mm. Since transport device 300 is arranged separately from machine tool 400, change in length of rail 331 causes change in a relative position of machine tool 400 to rail 331. As a result, transport device 300 may no longer be capable of transporting an object to be transported to machine tool 400.

For addressing to this, transport system 10 makes camera 338 photograph a reference shape existing in storage portion 250, and corrects a control parameter to be used in transporting an object to be transported stored in storage portion 250 to machine tool 400, on the basis of a position of the reference shape in the image. As a result, transport system 10 is capable of transporting the object to be transported to machine tool 400 securely even when the length of rail 331 changes.

Figure 4:
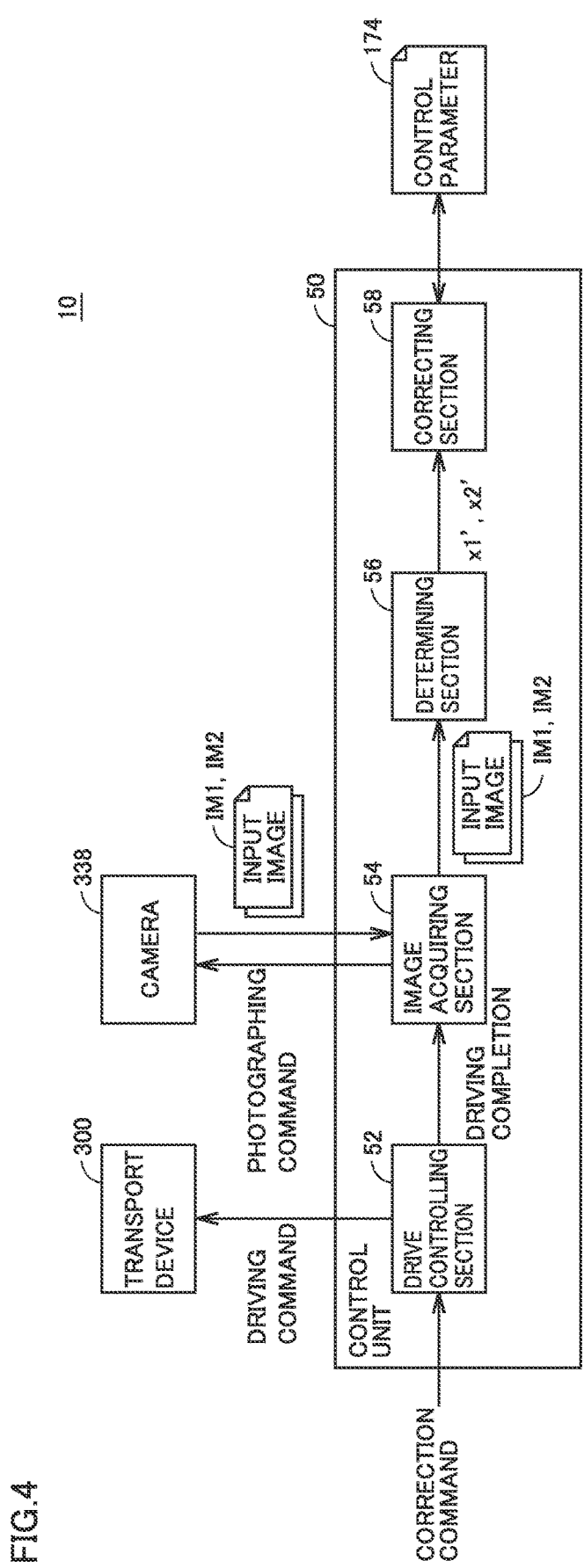
FIG. 4 is a diagram showing one example of functional constituents of the transport system.

Hereinafter, referring to FIG. 4 to FIG. 10, functional constituents for realizing such a correcting process is described. FIG. 4 is a diagram showing one example of functional constituents of transport system 10.

Transport system 10 includes as functional constituents, a drive controlling section 52, an image acquiring section 54, a determining section 56, and a correcting section 58. Hereinafter, these constituents are sequentially described.

The arrangement of the functional constituents is arbitrary. As one example, all the functional constituents shown in FIG. 4 may be implemented in management device 100 (see FIG. 2) described above, may be implemented in PLC 150 (see FIG. 2) described above, and may be implemented in operation terminal 200A (see FIG. 2) described above. Alternatively, part of the functional constituents shown in FIG. 4 may be implemented in management device 100, part of the remaining functional constituents may be implemented in PLC 150, and the remaining functional constituents may be implemented in operation terminal 200A. Alternatively, part of the functional constituents shown in FIG. 4 may be implemented in an external device such as a server, and may be implemented in dedicated hardware.

(D1. Drive Controlling Section 52 and Image Acquiring Section 54)

Figure 5:
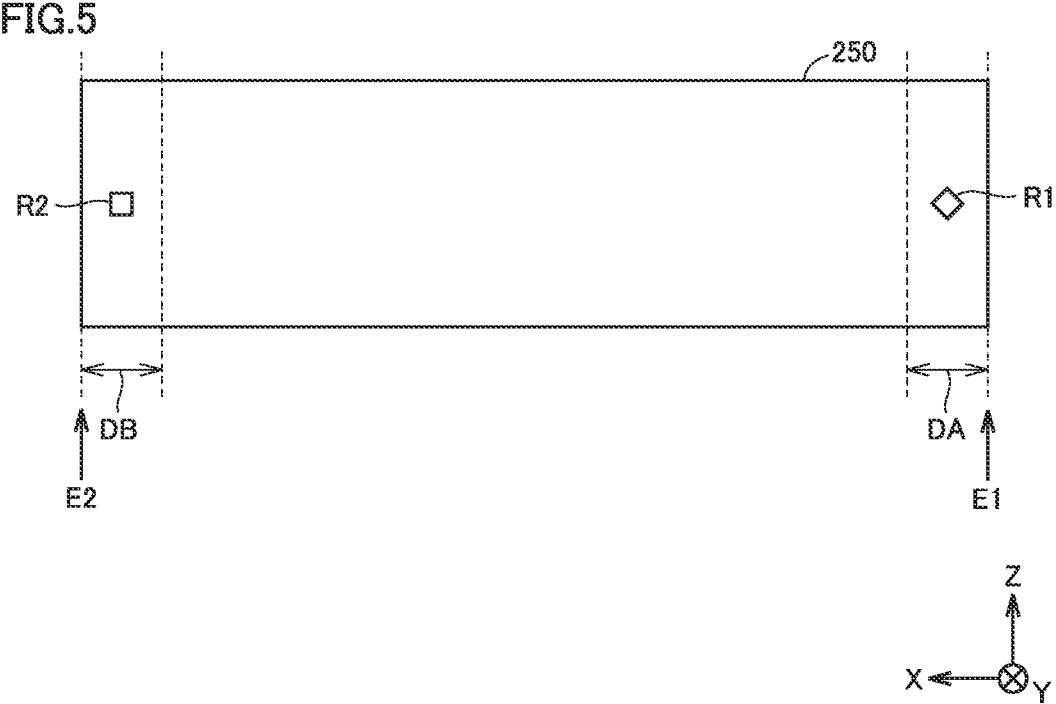
FIG. 5 is a view showing a storage portion from a Y direction.
Figure 6:
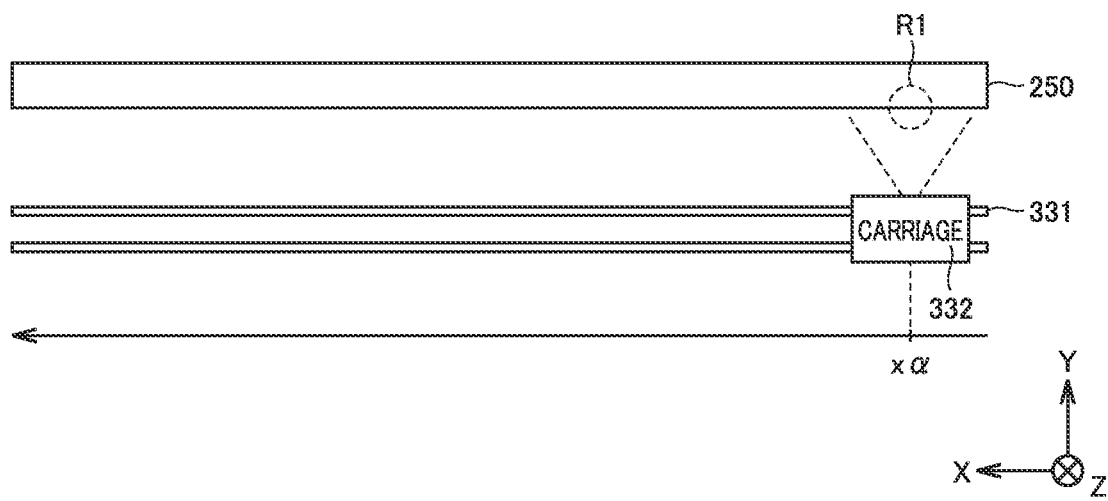
FIG. 6 is a view showing a storage portion from a Z direction.
Figure 7:
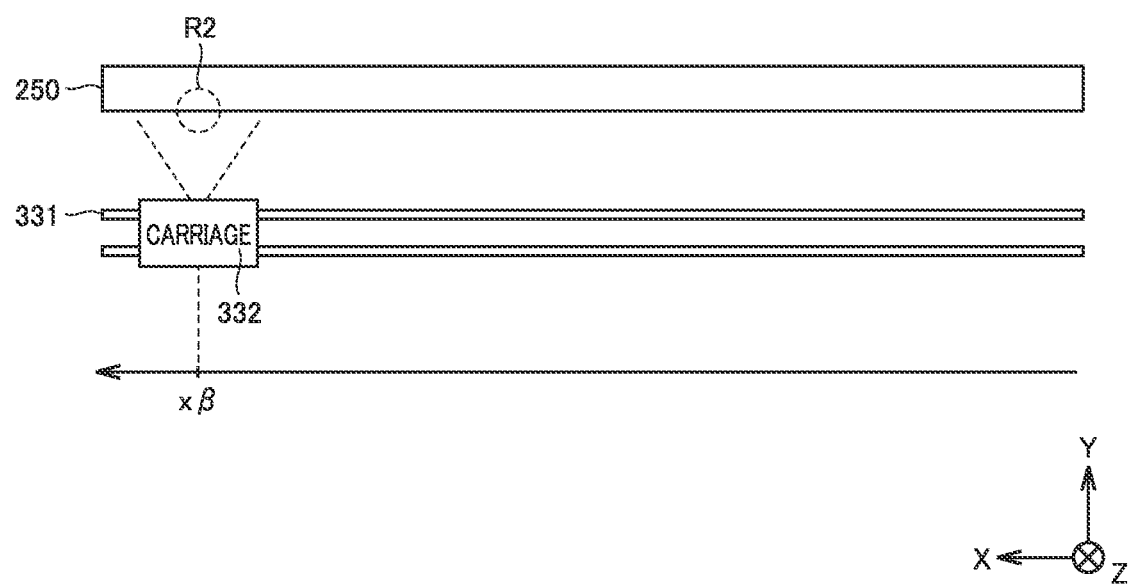
FIG. 7 is a view showing a storage portion from a Z direction.

First, referring to FIG. 5 to FIG. 7, functions of drive controlling section 52 and image acquiring section 54 are described.

Drive controlling section 52 receives a correction command for control parameter as input. The correction command is issued at a predetermined timing. As one example, the correction command is issued at startup of transport system 10. Alternatively, the correction command is issued based on that the current time becomes a preset time.

In response to reception of a correction command for control parameter, drive controlling section 52 outputs a drive command to motor driver 334A (see FIG. 2) described above to control motor 335A (see FIG. 2) to move carriage 332 to a predetermined position. Thus, drive controlling section 52 performs a preprocess for camera 338 described above to photograph a reference shape in storage portion 250.

Here, referring to FIG. 5 to FIG. 7, a reference shape existing in storage portion 250 is described. FIG. 5 is a view showing storage portion 250 from the Y direction. FIG. 6 and FIG. 7 are views showing storage portion 250 from the Z direction.

Storage portion 250 has at least one reference shape. A reference shape means any shape that can be recognized by a computer. In the example of FIG. 5, two reference shapes R1, R2 are shown.

Storage portion 250 has a reference shape R1 (first reference shape) within a range of distance "DA" from an end E1 of storage portion 250 in a direction parallel with rail 331 (namely, in X direction). Also, storage portion 250 has a reference shape R2 (second reference shape) within a range of distance "DB" from an end E2 of storage portion 250 in a direction parallel with rail 331 (namely, in X direction).

Typically, reference shapes R1, R2 are provided on the front face of storage portion 250. The front face of storage portion 250 is a surface on the side facing transport device 300. Reference shapes R1, R2 may be the same shape, and may be shapes that are different from each other.

As one example, reference shapes R1, R2 are specific marks given to tool setup device 200. The shape of the mark is arbitrary. As one example, the shape of the mark may be a circular shape such as a perfect circle and an ellipse, may be a polygonal shape such as a triangle and a quadrangle, and may be a more complicated shape.

As other example, reference shapes R1, R2 are characteristic structures formed in tool setup device 200. Reference shape R1 is, for example, a part (for example, corner or edge) of end E1 of storage portion 250. Reference shape R2 is, for example, a part (for example, corner or edge) of end E2 of storage portion 250.

As shown FIG. 6, drive controlling section 52 moves carriage 332 to a position "xα" facing reference shape R1 in response to reception of the correction command for control parameter. The position "xα" which is a movement destination is preliminarily set, for example, at the time of installation of transport system 10.

Thereafter, drive controlling section 52 drives arm robot 330 to have a predetermined posture and makes reference shape R1 be included in a field of view of camera 338. The predetermined posture is defined, for example, in a control program or a setting file and the like of arm robot 330. The predetermined posture includes the position and the angle of each joint of arm robot 330.

Typically, drive controlling section 52 changes the posture of arm robot 330 such that x direction of the image obtained from camera 338 corresponds to the extending direction of rail 331. In other words, drive controlling section 52 changes the posture of arm robot 330 such that the optical axis of camera 338 is orthogonal to the X-axial direction. Preferably, drive controlling section 52 changes the posture of arm robot 330 such that the optical axis of camera 338 is orthogonal to both the X-axial direction and the Z-axial direction (in other words, the optical axis of camera 338 is parallel with the Y axis).

Image acquiring section 54 outputs a photographing command to camera 338 based on that carriage 332 has moved to the position "xα", and arm robot 330 has had a predetermined posture. Accordingly, image acquiring section 54 acquires an input image IM1 that is a photo of reference shape R1 from camera 338. Acquired input image IM1 is output to determining section 56.

As shown in FIG. 7, drive controlling section 52 moves carriage 332 to a position "xβ" facing reference shape R2 after photographing of reference shape R1. The position "xβ" which is a movement destination is preliminarily set, for example, at the time of installation of transport system 10.

Thereafter, drive controlling section 52 drives arm robot 330 to have a predetermined posture and makes reference shape R2 be included in a field of view of camera 338. The predetermined posture is defined, for example, in a control program or a setting file and the like of arm robot 330. Typically, the posture of arm robot 330 at the time of photographing reference shape R2 is the same as the posture of arm robot 330 at the time of photographing reference shape R1.

Image acquiring section 54 outputs a photographing command to camera 338 based on that carriage 332 has moved to the position "xβ", and arm robot 330 has assumed a predetermined posture. Accordingly, image acquiring section 54 acquires an input image IM2 that is a photo of reference shape R2 from camera 338. Acquired input image IM2 is output to determining section 56.

(D2. Determining Section 56)

Figure 8:
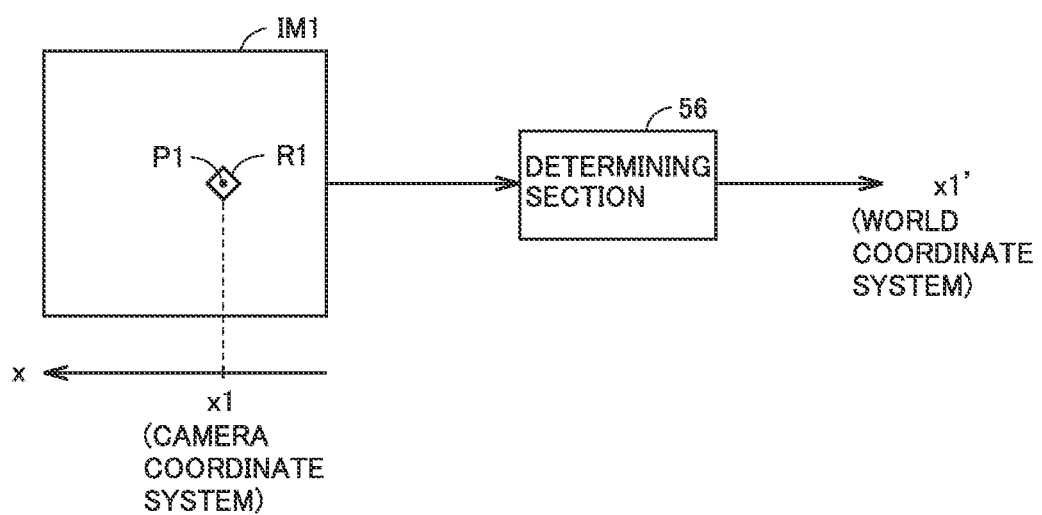
FIG. 8 is a diagram showing an input image obtained by photographing a reference shape.
Figure 9:
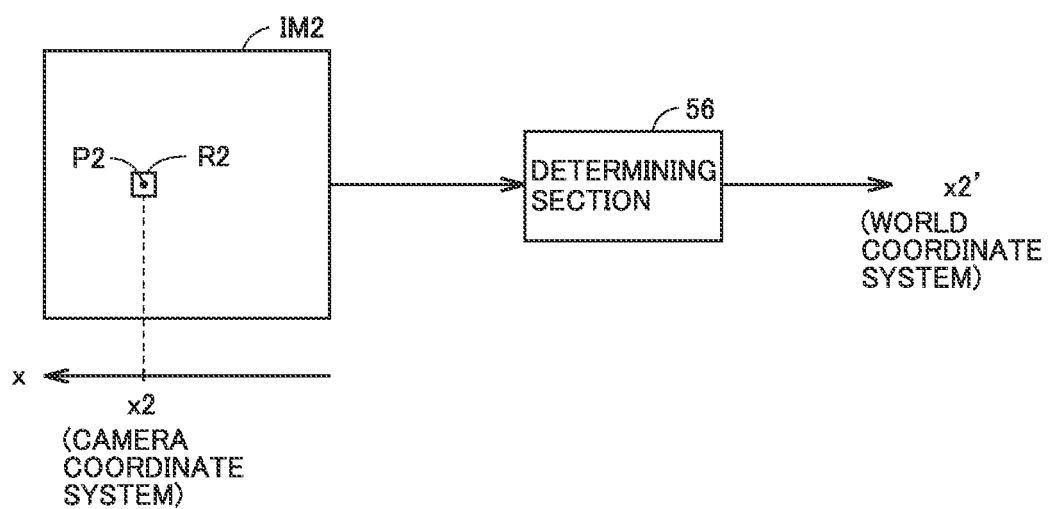
FIG. 9 is a diagram showing an input image obtained by photographing a reference shape.

Next, referring to FIG. 8 and FIG. 9, function of determining section 56 is described. FIG. 8 is a diagram showing input image IM1 obtained by photographing a reference shape R1.

Determining section 56 determines a position P1 of reference shape R1 in input image IM1. As one example, determining section 56 searches input image IM1 for reference shape R1 using a learned model.

The learned model is generated in advance by a learning process using data set for learning. The data set for learning includes a plurality of images for learning in which reference shape R1 is seen. For each image for learning, presence or absence of reference shape R1 is correlated as a label. An internal parameter of the learned model is optimized in advance by a learning process using such a data set for learning. Accordingly, upon reception of input of an image, the learned model outputs a probability that reference shape R1 is seen in the image.

In the learning technique for generating the learned model, various machine learning algorithms can be employed. As one example, deep learning, convolution neural network (CNN), fully convolutional neural network (FCN), support vector machine and the like are employed as the machine learning algorithms.

Determining section 56 sequentially inputs partial images in the rectangular regions to the learned model while the predetermined rectangular region is shifted on input image IM1. Upon reception of input of a partial image, the learned model outputs a probability that reference shape R1 is seen in the partial image. Determining section 56 determines that reference shape R1 is seen in a partial image where the probability exceeds a predetermined value and the probability is maximum, and detects the position (for example, center point) of the partial image in the input image IM1 as position P1 of reference shape R1.

Next, determining section 56 transforms a position "x1" represented by a coordinate system of camera 338 view into a position "x1'" represented by a world coordinate system on the basis of a predetermined coordinate transformation formula. As one example, since x coordinate in input image IM1 corresponds to the position in the extending direction of rail 331 (namely, X-axial direction), the coordinate transformation formula is uniquely determined when the positional relationship between camera 338 and storage portion 250 is known.

FIG. 9 is a diagram showing input image IM2 obtained by photographing reference shape R2. By the same process as described above, determining section 56 determines a position P2 of reference shape R2 in input image IM2. Next, determining section 56 transforms a position "x2" represented by a coordinate system of camera 338 view into a position "x2'" represented by a world coordinate system on the basis of a predetermined coordinate transformation formula. As one example, since x coordinate in input image IM2 corresponds to the position in the extending direction of rail 331 (namely, X-axial direction), the coordinate transformation formula is uniquely determined when the positional relationship between camera 338 and storage portion 250 is known.

The searching method for reference shapes R1, R2 is not limited to above-described method using a learned model, but an image process based on rule base may be employed.

As one example, determining section 56 holds a reference image that is a photo of reference shape R1 in advance, and performs scanning in input image IM1 for the reference image, and thus similarity with the reference image is calculated for each region in input image IM1. Then, determining section 56 recognizes the region where the similarity exceeds a predetermined value, and the similarity is maximum as a part where reference shape R1 is seen.

Similarly, determining section 56 holds a reference image that is a photo of reference shape R2 in advance, and performs scanning in input image IM2 for the reference image, and thus similarity with the reference image is calculated for each region in input image IM2. Then, determining section 56 recognizes the region where the similarity exceeds a predetermined value, and the similarity is maximum as a part where reference shape R2 is seen.

(D3. Correcting Section 58)

Next, referring to FIG. 10, function of correcting section 58 is described. FIG. 10 is a chart schematically showing a correcting process of a control parameter 173 by correcting section 58.

Correcting section 58 corrects control parameter 173 of transport device 300 on the basis of position "x1'" of reference shape R1 determined from input image EVIL and from position "x2'" of reference shape R2 determined from input image IM2. Control parameter 173 is a parameter used in transporting a tool stored in storage portion 250 to machine tool 400.

FIG. 10 shows a control parameter 173A before correction, and a control parameter 173B after correction. Control parameter 173A includes a position "xA" that is a position of reference shape R1 before change in length of rail 331, and a position "xB" that is a position of reference shape R2 before change in length of rail 331, and distances "D1" to "Dn" from position "xA" to each machine tool 400.

In a certain aspect, positions "xA", "xB" are preliminarily set. In other aspect, positions "xA", "xB" are measured by the above-described method using camera 338 at a predetermined timing such as at the time of installation of transport system 10.

Distances "D1" to "Dn" are defined in control parameter 173 for the number of machine tools 400 provided in transport system 10. Distance "D1" indicates the distance from position "xA" to machine tool 400A. Distance "D2" indicates the distance from position "xA" to machine tool 400B. Distance "D3" indicates the distance from position "xA" to machine tool 400C. Distance "Dn" indicates the distance from position "xA" to machine tool 400N.

A control parameter 173B includes above-described positions "x1'", "x2'" determined by determining section 56. Correcting section 58 corrects distances "D1" to "Dn" defined in control parameter 173A using position "xA", position "xB", position "x1'", and position "x2'". As one example, correcting section 58 corrects distances "D1" to "Dn" according to the following formula (1).

$$Dn'=Dn\cdot(xB-xA)/(x2'-x1') \qquad (1)$$

"Dn'" shown in formula (1) represents a distance from position "x1'" to the n-th machine tool after correction. "Dn" represents a distance from position "xA" to the n-th machine tool before correction.

Thus, transport system 10 corrects control parameter 173 regarding movement of transport device 300 in the direction parallel with rail 331. As a result, even when the length of rail 331 changes under the influence of environmental change, transport system 10 is capable of grasp the position of machine tool 400 correctly.

In a certain aspect, distances "D1'" to "Dn'" defined in control parameter 173 are used for movement control of carriage 332 in carrying in a tool to machine tool 400, or in carrying out a tool from machine tool 400. In other aspect, distances "D1'" to "Dn'" defined in control parameter 173 are used for drive control of arm robot 330 in carrying in a tool to machine tool 400, or in carrying out a tool from machine tool 400.

E. MODIFIED EXAMPLE OF STORAGE PORTION 250

Figure 11:
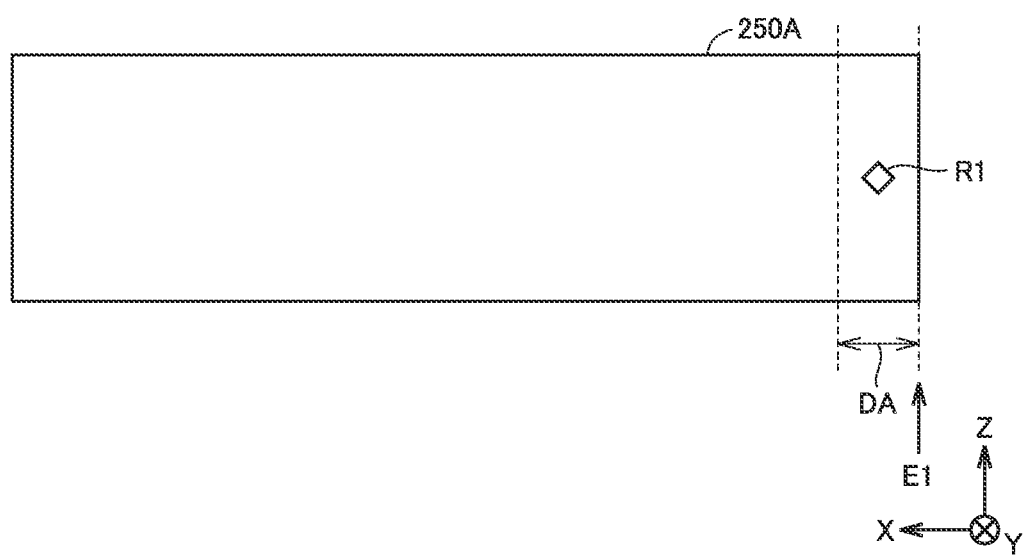
FIG. 11 is a view showing a storage portion according to a modified example.

Next, referring to FIG. 11, a modified example of storage portion 250 is described.

In the above description, description was made for the case where storage portion 250 has two reference shapes R1, R2, however, the number of reference shapes possessed by storage portion 250 may be one. FIG. 11 is a view showing a storage portion 250A according to a modified example.

As shown in FIG. 11, storage portion 250A has reference shape R1 within a range of distance "DA" from end E1 of storage portion 250A in a direction parallel with rail 331 (namely, in X direction).

As a specific correcting process using one reference shape R1, first, drive controlling section 52 moves carriage 332 to the front of reference shape R1 in response to reception of the correction command for control parameter. Thereafter, drive controlling section 52 drives arm robot 330 to assume a predetermined posture and makes reference shape R1 be included in a field of view of camera 338. Thereafter, image acquiring section 54 outputs a photographing command to camera 338. Accordingly, image acquiring section 54 acquires input image IM1 that is a photo of reference shape R1 from camera 338.

Next, determining section 56 searches input image IM1 for reference shape R1, and determines position P1 of reference shape R1 in input image IM1. Since the searching method for reference shape R1 is as described above, the description thereof will not be repeated. Thereafter, determining section 56 transforms a position "x1" represented by a coordinate system of camera 338 view into a position "x1'" represented by a world coordinate system on the basis of a predetermined coordinate transformation formula.

Figure 12:
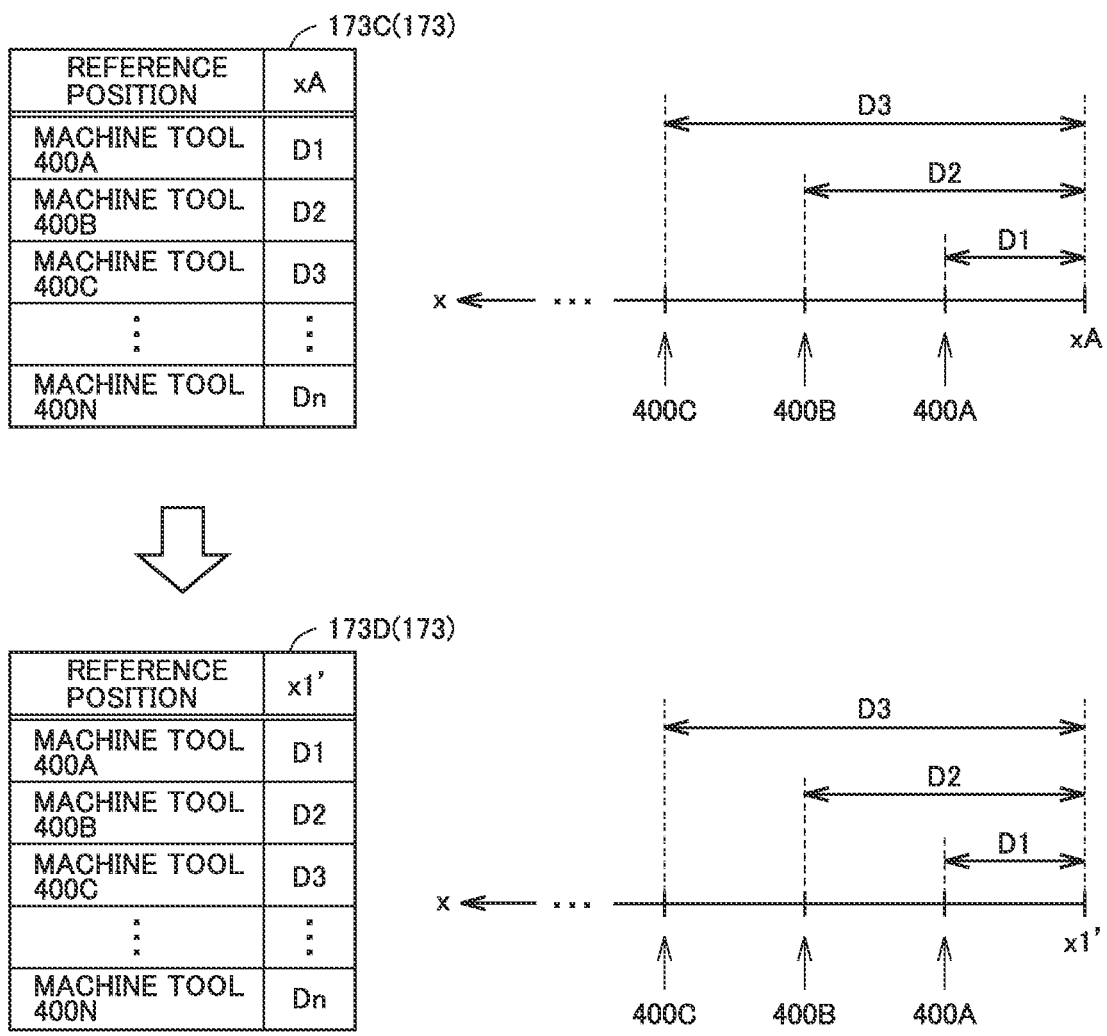
FIG. 12 is a chart schematically showing a correcting process of control parameter by a correcting section according to a modified example.

Next, correcting section 58 corrects control parameter 173 of transport device 300 on the basis of position "x1'" of reference shape R1 determined from input image IM1. FIG. 12 is a chart schematically showing a correcting process of control parameter 173 by correcting section 58 according to a modified example.

FIG. 12 shows a control parameter 173C before correction, and a control parameter 173D after correction. As shown in FIG. 12, correcting section 58 corrects position "xA" of reference shape R1 defined in control parameter 173C into position "x1'" in control parameter 173D. Transport system 10 determines respective positions of machine tools 400A to 400N on the basis of position "x1'" after correction.

While description was made for the case where reference shape R1 is provided within a range of distance "DA" from end E1 of storage portion 250 in the above description, reference shape R1 is provided at any position on the front face of storage portion 250. The front face used herein refers to the face on the side facing transport device 300.

F. TOOL CARRYING-IN STEP INTO STORAGE PORTION 250

Figure 13:
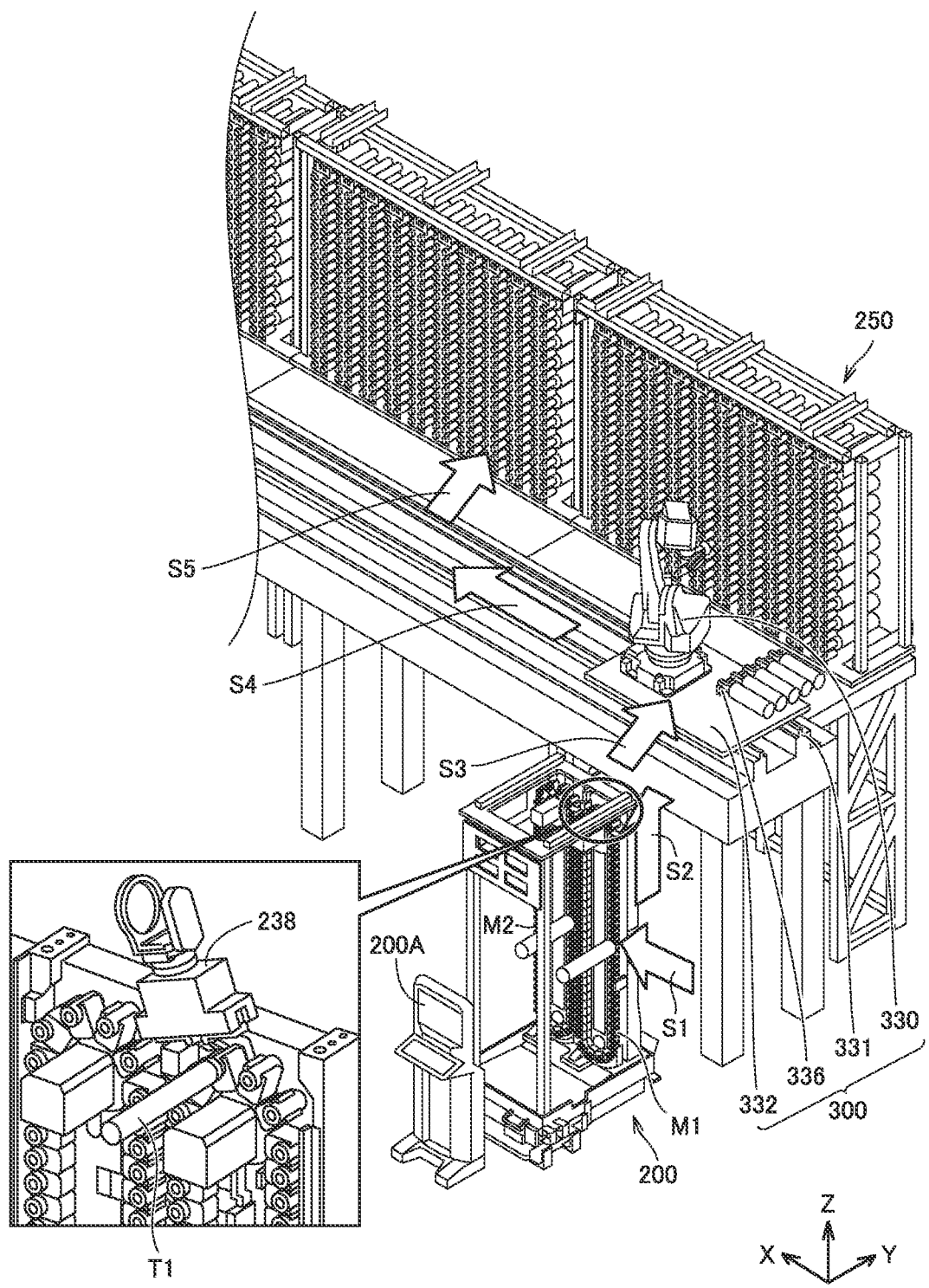
FIG. 13 is a view schematically showing a flow of a tool carrying-in step from a tool setup device to the storage portion.

Next, referring to FIG. 13 and FIG. 14, a tool carrying-in step is described. FIG. 13 is a view schematically showing a flow of a tool carrying-in step from tool setup device 200 to storage portion 250.

In step S1, an operator sets a tool T1 to be carried-in in a magazine M1. Near the position to which tool T1 is to be set, a reading device (not shown) for a bar code or a QR code (registered tradename) is provided, and the reading device reads a bar code or a QR code given to tool T1. Thus, identification information of tool T1 to be carried-in is read. Upon completion of the setting of tool T1, the operator performs completion operation on operation terminal 200A.

Next, in step S2, control unit 50 controls motor 235A (see FIG. 2), and drives magazine M1 in tool setup device 200. Thus, control unit 50 moves tool T1 to be carried-in to a predetermined tool change position. Near the tool change position, ATC (Automatic Train Control) 238 is provided. ATC 238 detaches tool T1 at the tool change position from magazine M1 and makes a half turn.

Next, in step S3, arm robot 330 detaches tool T1 from ATC 238, and places tool T1 on a temporary storage place 336 on carriage 332. When there is other tool to be carried-in, the process of steps S1 to S3 is repeated unless the maximum number of storage of temporary storage place 336 is not exceeded.

Next, in step S4, control unit 50 controls motor 335A (see FIG. 2), and drives carriage 332. Thus, control unit 50 moves carriage 332 to a designated tool carry-in position. The tool carry-in position is determined, for example, on the basis of tool information 174 shown in FIG. 14.

FIG. 14 is a view showing one example of data structure of tool information 174. In tool information 174, each storage place in storage portion 250, coordinate values of the storage place, identification information of a tool stored in the storage place, a storage state of the tool in the storage place, and a residual service life of the tool stored in the storage place are correlated.

The storage place defined in tool information 174 may be indicated by a number such as ID (Identification), and may be indicated by a storage place name. Coordinate values of storage place defined in tool information 174 may be defined two-dimensionally, and may be defined three-dimensionally. In the example of FIG. 14, the coordinate values are indicated by a coordinate value "x" in the direction parallel with rail 331, and a coordinate value "z" in the vertical direction. Identification information of tool defined in tool information 174 may be indicated by a tool number such as ID, and may be indicated by a tool name. A storage state defined in tool information 174 indicates that the storage place is vacant or not, or indicates that the tool stored in the storage place is normal or not. A residual service life of tool defined in tool information 174 may be indicated by a current total use time to a maximum usable time of the tool, and may be indicated by a current total number of use times to a maximum usable times of the tool.

Control unit 50 determines a storage destination of tool T1 by referring to a vacant storage place defined in tool information 174. When there are a plurality of vacant storage places, control unit 50 may determine one storage place randomly selected from the plurality of vacant storage places as a storage destination, and may determine one storage place located closer to transport device 300 selected from the plurality of vacant storage places as a storage destination.

Referring again to FIG. 13, in step S5, arm robot 330 detaches tool T1 to be carried-in from temporary storage place 336, and stores tool T1 in the determined storage destination. Thereafter, control unit 50 writes the storage place of tool T1 and the identification information of tool T1 to tool information 174.

When other tool to be carried-in is left on temporary storage place 336, control unit 50 repeats the process of steps S4, S5 until there is no tool on temporary storage place 336.

G. STEP OF CARRYING-IN TOOL INTO MACHINE TOOL 400

Figure 15:
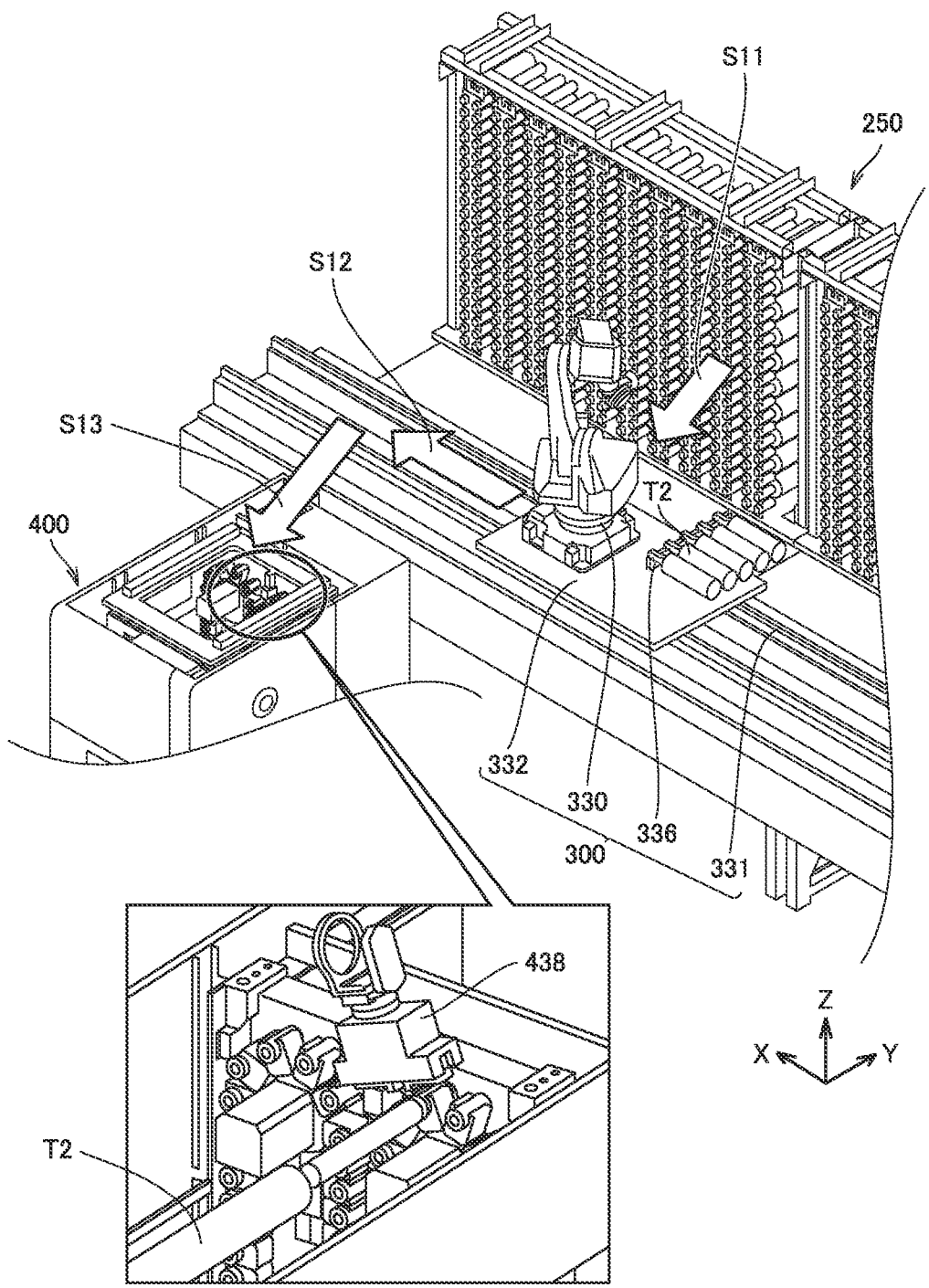
FIG. 15 is a view schematically showing a flow of a tool carrying-in step from the storage portion to a machine tool.

Next, referring to FIG. 15, a tool carrying-in step following FIG. 13 is described. FIG. 15 is a view schematically showing a flow of the tool carrying-in step into machine tool 400 from storage portion 250.

The case that control unit 50 receives a transport command of a tool T2 to machine tool 400 is assumed. Tool T2 to be transported, and machine tool 400 that is a transport destination are designated, for example, on operation terminal 200A by the operator. Control unit 50 determines a storage place of tool T2 from tool information 174 (see FIG. 14) described above in response to reception of the transport command for tool T2. Thereafter, control unit 50 drives carriage 332 by controlling motor 335A (see FIG. 2), and moves carriage 332 to the front of the storage place of tool T2.

Next, in step S11, arm robot 330 takes tool T2 to be transported out of storage portion 250, and places tool T2 on temporary storage place 336 on carriage 332.

Next, in step S12, control unit 50 determines the position of machine tool 400 that is a transport destination by referring to control parameter 173 (see FIG. 10) described above. Thereafter, control unit 50 drives carriage 332 to the position of machine tool 400 that is a transport destination by controlling motor 335A (see FIG. 2).

Next, in step S13, arm robot 330 passes tool T2 to ATC 438 provided in machine tool 400 that is a transport destination. Thereafter, ATC 438 attaches tool T2 received from arm robot 330 to ATC 438 (see FIG. 15) in machine tool 400. Thereafter, ATC 438 sets tool T2 in magazine in machine tool 400. Thus, tool T2 becomes ready to use in machine tool 400.

H. TOOL CARRYING-OUT STEP TO TOOL SETUP DEVICE 200

Figure 16:
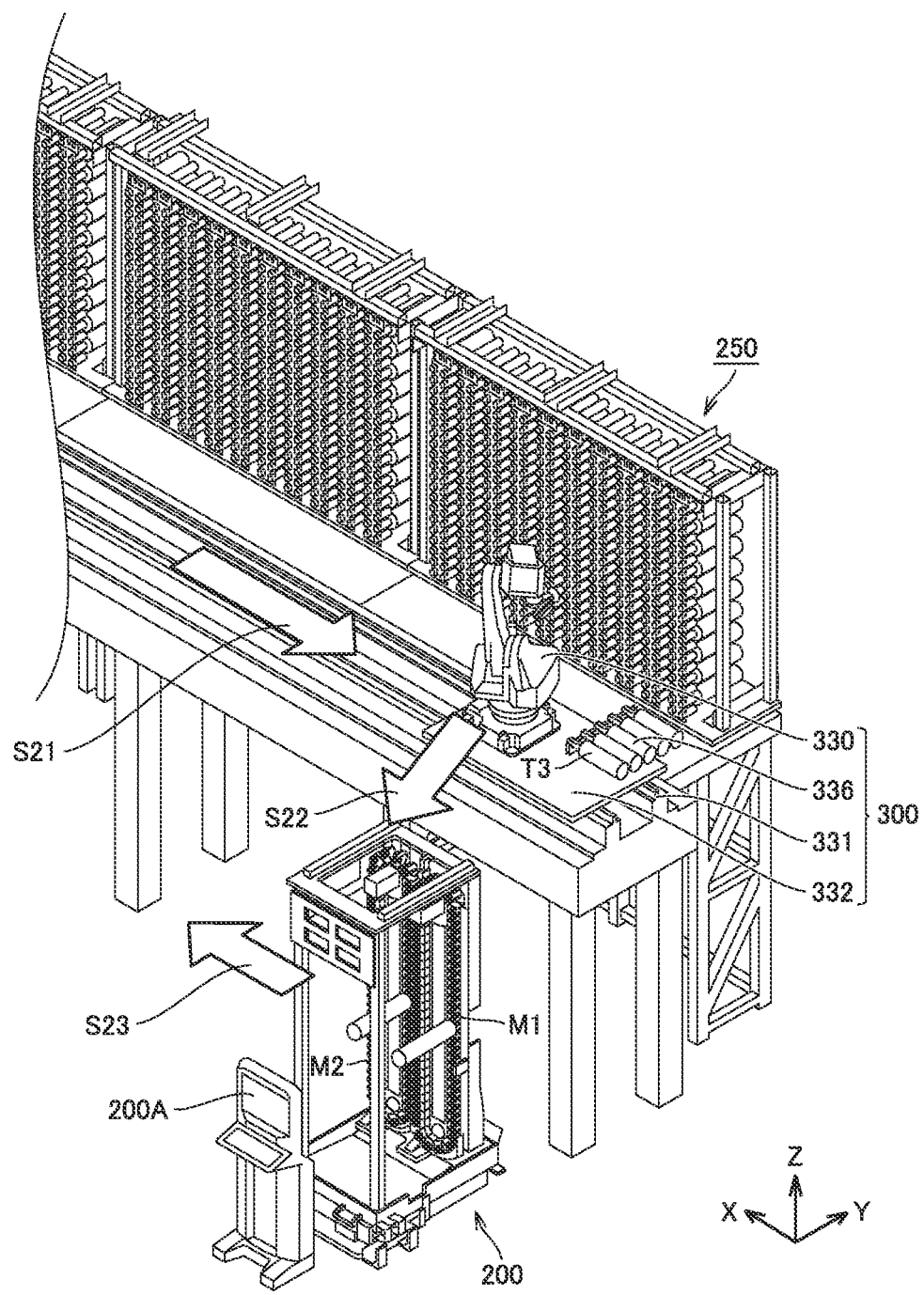
FIG. 16 is a view schematically showing a flow of a tool carrying-out step from the storage portion to the tool setup device.

Next, referring to FIG. 16, a tool carrying-out step is described. FIG. 16 is a view schematically showing a flow of a tool carrying-out step from storage portion 250 to tool setup device 200.

The case that control unit 50 receives a transport command of a tool T3 to tool setup device 200 is assumed. Based on this, control unit 50 determines a storage destination of tool T3 according to tool information 174 (see FIG. 14) described above. Thereafter, control unit 50 drives carriage 332 by controlling motor 335A (see FIG. 2) described above, and moves carriage 332 to the front of the storage destination of tool T3. Next, arm robot 330 takes tool T3 out of storage portion 250, and places tool T3 on temporary storage place 336 on carriage 332. Also, control unit 50 deletes the identification information of tool T3 from tool information 174, and rewrites the storage source of tool T3 to a vacant state.

Next, in step S21, control unit 50 drives carriage 332 by controlling motor 335A described above, and moves carriage 332 to the front of tool setup device 200. Next, in step S22, arm robot 330 detaches tool T3 to be carried-out from temporary storage place 336, and attaches tool T3 to ATC238 (see FIG. 13) described above provided in tool setup device 200. Thereafter, ATC238 attaches tool T3 to magazine M2 of tool setup device 200.

Next, in step S23, control unit 50 drives magazine M2 for carrying-out by controlling motor 235B (see FIG. 2) described above, and moves tool T3 to be carried-out to an exit. Thereafter, the operator takes tool T3 to be carried-out thorough the exit.

I. HARDWARE CONFIGURATION OF MANAGEMENT DEVICE 100

Figure 17:
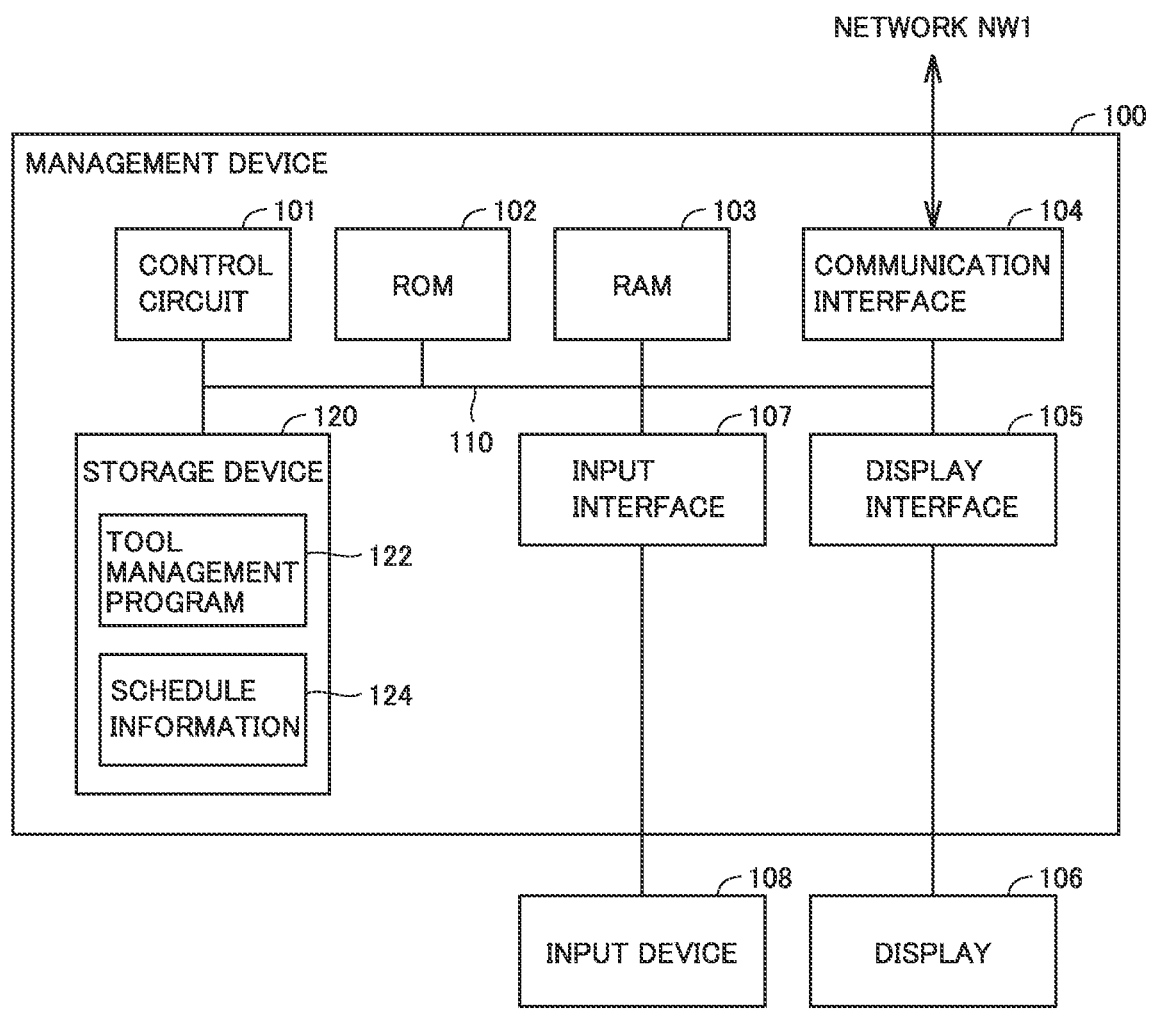
FIG. 17 is a diagram showing one example of hardware configuration of a management device.

Referring to FIG. 17, a hardware configuration of management device 100 is described. FIG. 17 is a diagram showing one example of hardware configuration of management device 100.

Management device 100 includes a control circuit 101, ROM (Read Only Memory) 102, a RAM (Random Access Memory) 103, a communication interface 104, a display interface 105, an input interface 107, and a storage device 120. These components are connected to a bus 110.

Control circuit 101 is configured, for example, by at least one integrated circuit. The integrated circuit can be configured by, for example, at least one CPU (Central Processing Unit), at least one GPU (Graphics Processing Unit), at least one ASIC (Application Specific Integrated Circuit), at least one FPGA (Field Programmable Gate Array), or combination thereof and the like.

Control circuit 101 controls operations of management device 100 by executing a tool management program 122 and various programs of an operating system or the like. Control circuit 101 reads out tool management program 122 from storage device 120 or ROM 102 to RAM 103 in response to reception of a command for executing tool management program 122. RAM 103 functions as working memory, and temporarily stores various data required for executing tool management program 122.

To communication interface 104, LAN (Local Area Network), antenna and the like are connected. Management device 100 is connected to network NW1 via communication interface 104. Thus, management device 100 exchanges data with an external device connected to network NW1. The external device includes, for example, PLC 150, a server (not shown) and the like.

To display interface 105, a display 106 is connected. Display interface 105 transmits an image signal for displaying an image to display 106 according to a command from control circuit 101 or the like. Display 106 displays, for example, an operation screen for receiving a tool carrying-in command, or a selection screen for designating a tool to be transported. Display 106 is, for example, a liquid crystal display, an inorganic EL (Electro Luminescence) display, or other display device. Display 106 may be configured integrally with management device 100, and may be configured separately from management device 100.

To input interface 107, an input device 108 is connected. Input device 108 is, for example, a mouse, a keyboard, a touch panel, or other device capable of receiving an operation by a user. Input device 108 may be configured integrally with management device 100, and may be configured separately from management device 100.

Storage device 120 is, for example, a storage medium such as hard disc or flush memory. Storage device 120 stores tool management program 122 and schedule information 124 and the like. In schedule information 124, a transport order of tools or the like is defined. The storage location of tool management program 122 and schedule information 124 is not limited to storage device 120, and tool management program 122 and schedule information 124 may be stored in a storage area of control circuit 101 (for example, cash memory and the like), ROM 102, RAM 103, an external device (for example, server) and the like.

Tool management program 122 may be provided as a part of a desired program to which it is incorporated, rather than as a single program. In this case, the transport controlling process by tool management program 122 is realized in cooperation with the desired program. Such a program without some module does not apart from the scope of tool management program 122 according to the present embodiment. Further, part or the whole of functions provided by tool management program 122 may be realized by dedicated hardware. Further, management device 100 may be configured in a form of a so-called cloud service in which at least one server executes part of processes of tool management program 122.

J. HARDWARE CONFIGURATION OF PLC 150

Figure 18:
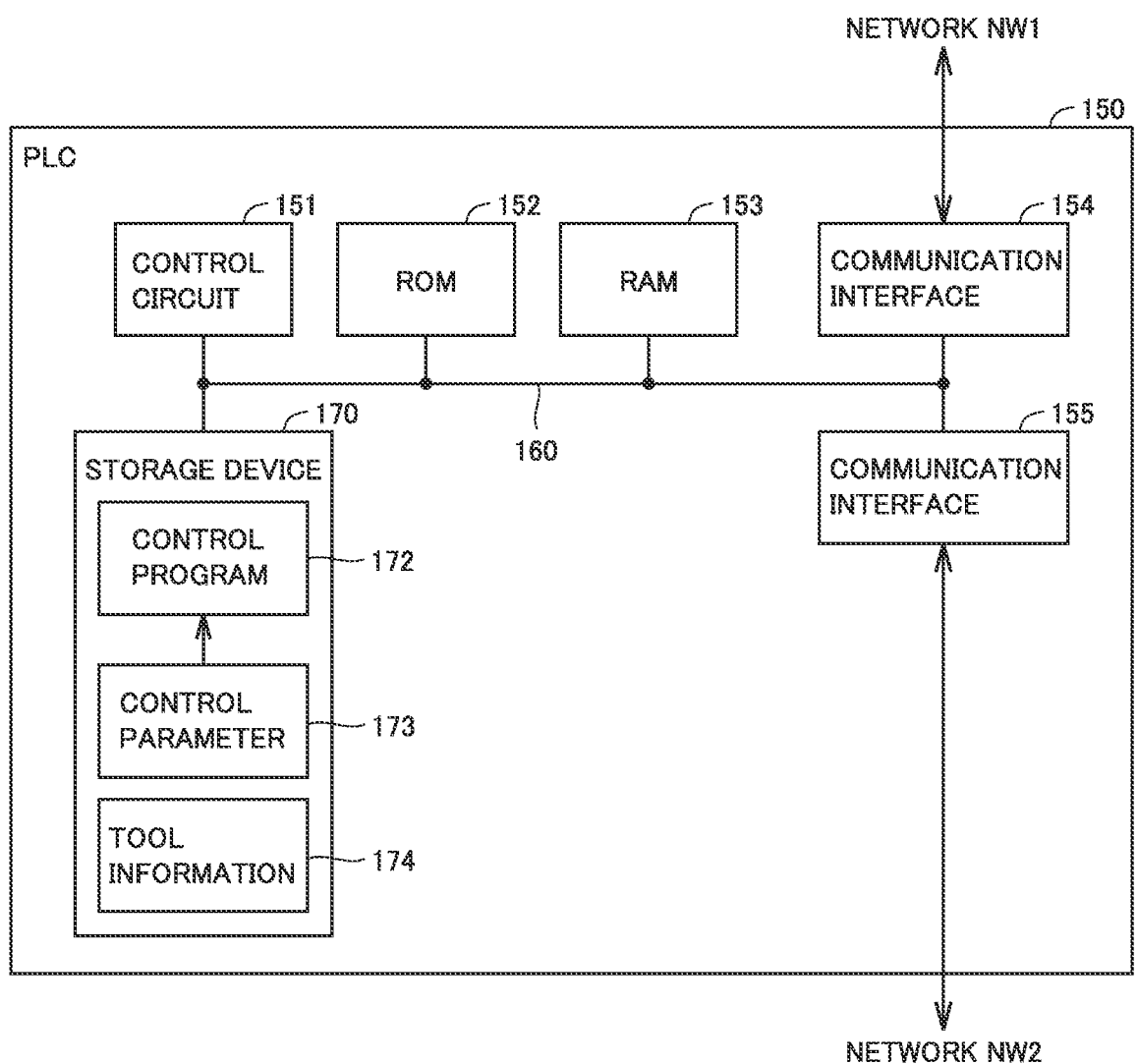
FIG. 18 is a block diagram showing principal hardware configuration of PLC (Programmable Logic Controller).

Referring to FIG. 18, one example of hardware configuration of PLC 150 is described. FIG. 18 is a block diagram showing a principal hardware configuration of PLC 150.

PLC 150 includes a control circuit 151, a ROM (Read Only Memory) 152, a RAM (Random Access Memory) 153, a communication interfaces 154, 155, and a storage device 170. These components are connected to a bus 160.

Control circuit 151 is configured by at least one integrated circuit. The integrated circuit is configured, for example, by at least one CPU, at least one MPU (Micro Processing Unit), at least one ASIC, at least one FPGA or combination thereof or the like.

Control circuit 151 controls operations of transport device 300, machine tool 400 and the like by executing various programs such as a control program 172. Control circuit 151 reads out control program 172 from storage device 170 into ROM 152 in response to reception of a command for executing control program 172. RAM 153 functions as working memory, and temporarily stores various data required for executing control program 172.

To communication interface 154, LAN, an antenna and the like are connected. PLC 150 is connected to network NW1 via communication interface 154. Thus, PLC 150 exchanges data with an external device connected to network NW1. The external device includes, for example, management device 100, a server (not shown) and the like.

Communication interface 155 is an interface for connecting to network NW2 which is a filed network. PLC 150 exchanges data with an external device connected to network NW2 via communication interface 155. The external device includes, for example, remote I/O units 61 to 63 described above.

Storage device 170 is, for example, a storage medium such as hard disc or flush memory. Storage device 170 stores control program 172, control parameter 173 (see FIG. 10) described above, and tool information 174 (see FIG. 14) described above, and so on. The storage location of these is not limited to storage device 170, and these may be stored in a storage area of control circuit 151 (for example, cash area and the like), ROM 152, RAM 153, an external device (for example, server) and the like.

Control program 172 may be provided as a part of a desired program to which it is incorporated, rather than as a single program. In this case, the control process according to the present embodiment is realized in cooperation with the desired program. Such a program without some module does not apart from the scope of control program 172 according to the present embodiment. Further, part or the whole of functions provided by control program 172 may be realized by dedicated hardware. Further, PLC 150 may be configured in a form of a so-called cloud service in which at least one server executes part of processes of control program 172.

K. HARDWARE CONFIGURATION OF OPERATION TERMINAL 200A

Figure 19:
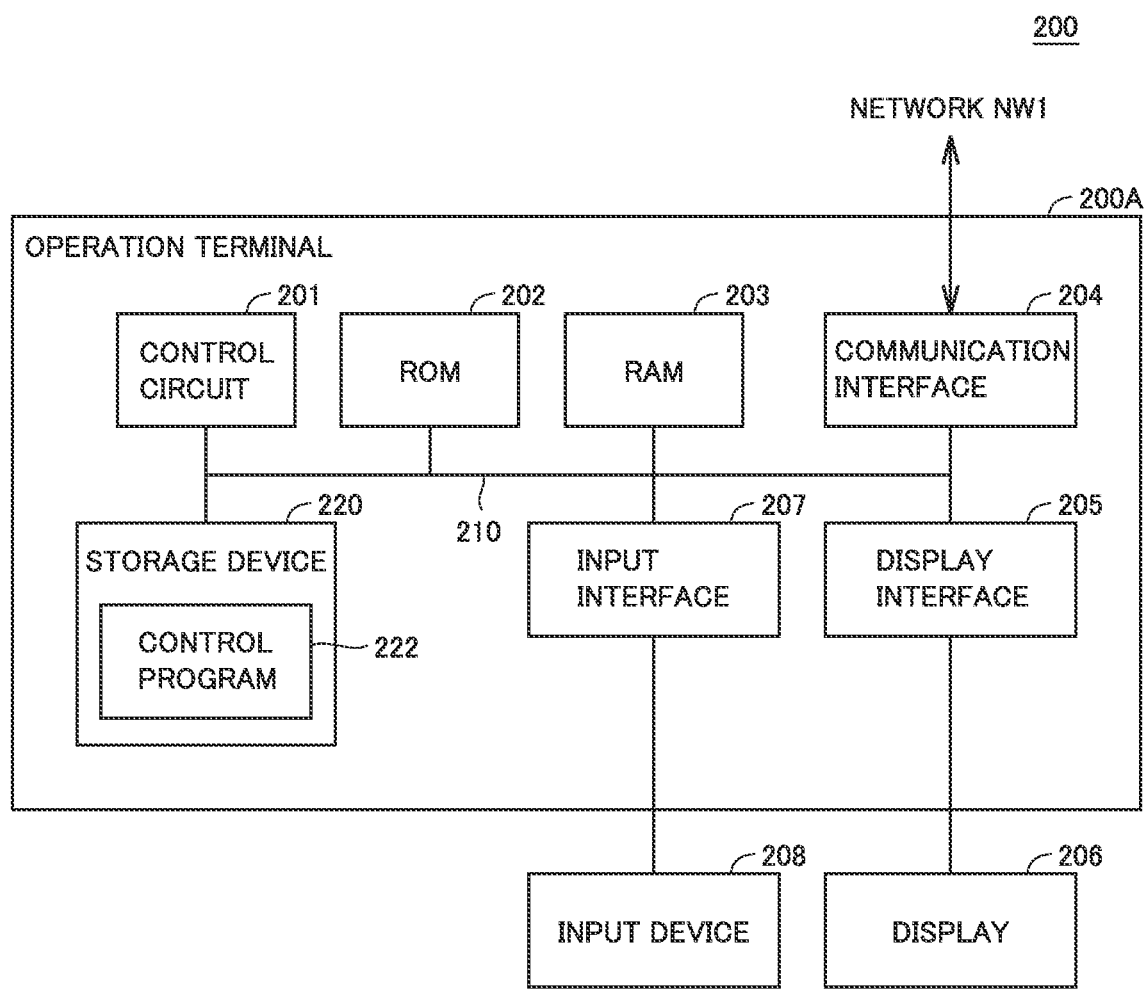
FIG. 19 is a diagram showing one example of hardware configuration of an operation terminal.

Referring to FIG. 19, hardware configuration of operation terminal 200A shown in FIG. 1 is described. FIG. 19 is a diagram showing one example of hardware configuration of operation terminal 200A.

Operation terminal 200A includes a control circuit 201, a ROM 202, a RAM 203, a communication interface 204, a display interface 205, an input interface 207, and a storage device 220. These components are connected to a bus 210.

Control circuit 201 is configured, for example, by at least one integrated circuit. The integrated circuit can be configured, for example, by at least one CPU, at least one GPU, at least one ASIC, at least one FPGA or combination thereof or the like.

Control circuit 201 controls operations of operation terminal 200A by executing a control program 222 and various programs of an operating system or the like. Control circuit 201 reads out control program 222 from storage device 220 or ROM 202 into RAM 203 in response to reception of a command for executing control program 222. RAM 203 functions as working memory, and temporarily stores various data required for executing control program 222.

To communication interface 204, LAN, an antenna and the like are connected. Operation terminal 200A is connected to network NW1 via communication interface 204. Thus, operation terminal 200A exchanges data with an external device connected to network NW1. The external device includes, for example, PLC 150, a server (not shown) and the like.

To display interface 205, a display 206 is connected. Display interface 205 transmits an image signal for displaying an image to display 206 according to a command from control circuit 201 or the like. Display 206 displays, for example, an operation screen for receiving a tool carrying-in command, a tool selection screen for designating a tool to be transported, or a machine tool selection screen for designating machine tool 400 that is a transport destination. Display 206 is, for example, a liquid crystal display, an inorganic EL display, or other display device. Display 206 may be configured integrally with operation terminal 200A, and may be configured separately from operation terminal 200A.

To input interface 207, an input device 208 is connected. Input device 208 is, for example, a mouse, a keyboard, a touch panel, or other device capable of receiving an operation by a user. Input device 208 may be configured integrally with operation terminal 200A, and may be configured separately from operation terminal 200A.

Storage device 220 is, for example, a storage medium such as hard disc or flush memory. Storage device 220 stores control program 222 and the like. The storage location of control program 222 is not limited to storage device 220, and these may be stored in a storage area of control circuit 201 (for example, cash memory and the like), ROM 202, RAM 203, an external device (for example, server) and the like.

Control program 222 may be provided as a part of a desired program to which it is incorporated rather than as a single program. In this case, the control process by control program 222 is realized in cooperation with the desired program. Such a program without some module does not apart from the scope of control program 222 according to the present embodiment. Further, part or the whole of functions provided by control program 222 may be realized by dedicated hardware. Further, operation terminal 200A may be configured in a form of a so-called cloud service in which at least one server executes part of processes of control program 222.

L. INITIAL SETTING

Figure 20:
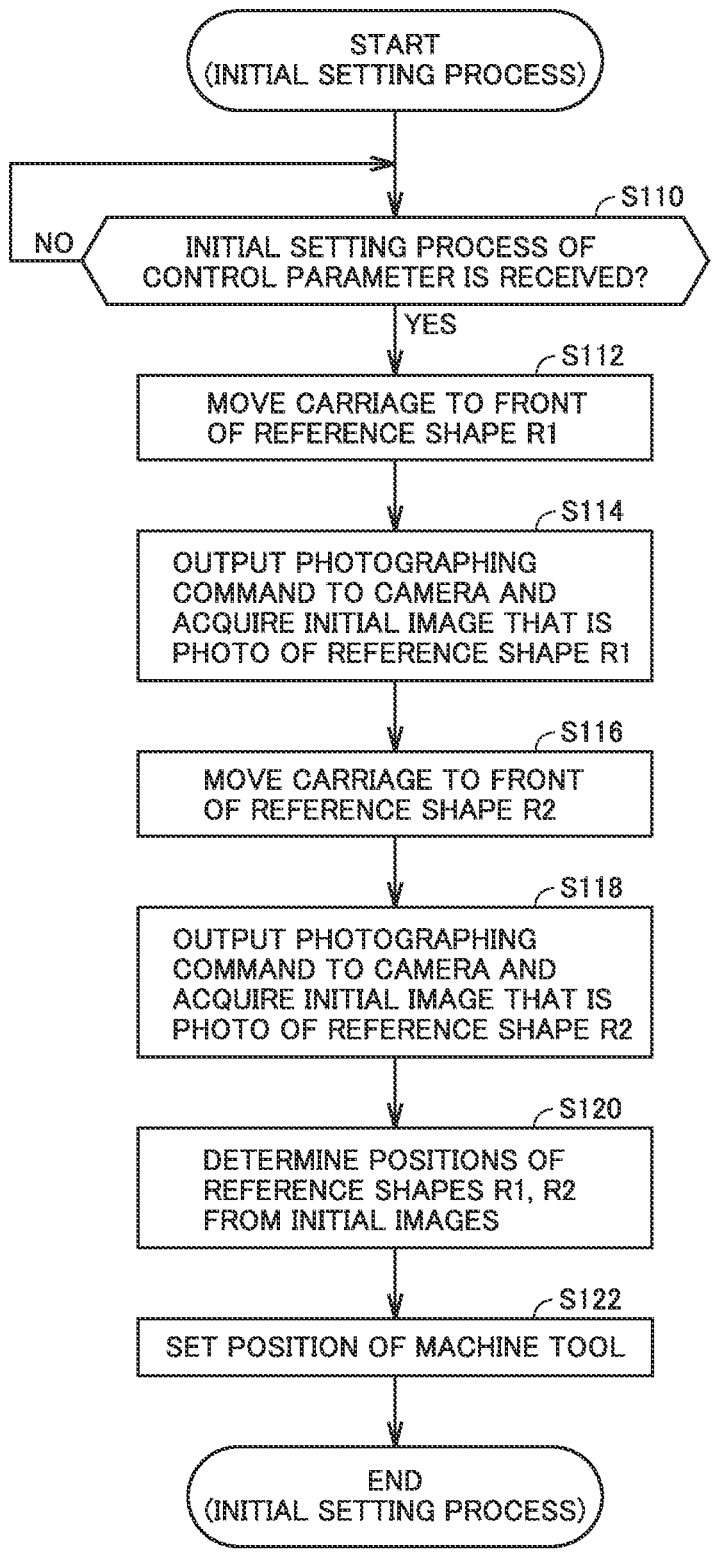
FIG. 20 is a flowchart showing a flow of an initial setting process of control parameter.

Next, referring to FIG. 20, a flow of initial setting process of control parameter 173 is described. FIG. 20 is a flowchart showing a flow of an initial setting process of control parameter 173.

The process shown in FIG. 20 is realized, for example, by executing control program 172 (see FIG. 11) described above by control circuit 151 of PLC 150. In other aspect, part or the whole of the process may be executed by a circuit element or other hardware.

In step S110, control circuit 151 determines whether an initial setting command of control parameter 173 is received. As one example, a correction command for control parameter 173 is issued based on that an initial setting button on the operation screen displayed in operation terminal 200A is pressed down. As other example, a correction command for control parameter 173 is issued at a predetermined timing such as at the time of introduction of transport system 10. Control circuit 151 switches the control to step S112 when it is determined that an initial setting command of control parameter 173 is received (YES in step S110). If it is not so (NO in step S110), control circuit 151 again executes the process in step S110.

In step S112, control circuit 151 functions as drive controlling section 52 (see FIG. 4) described above, and moves carriage 332 to the front of reference shape R1 existing in storage portion 250. Thereafter, control circuit 151 drives arm robot 330 to assume a predetermined posture and makes reference shape R1 be included in a field of view of camera 338.

In step S114, control circuit 151 functions as image acquiring section 54 (see FIG. 4) described above, and outputs a photographing command to camera 338. Accordingly, control circuit 151 acquires an initial image that is a photo of reference shape R1 from camera 338.

In step S116, control circuit 151 functions as drive controlling section 52 (see FIG. 4) described above, and moves carriage 332 to the front of reference shape R2 existing in storage portion 250. Thereafter, control circuit 151 drives arm robot 330 to assume a predetermined posture and makes reference shape R2 be included in a field of view of camera 338.

In step S118, control circuit 151 functions as image acquiring section 54 (see FIG. 4) described above, and outputs a photographing command to camera 338. Accordingly, control circuit 151 acquires an initial image that is a photo of reference shape R2 from camera 338.

In step S120, control circuit 151 functions as determining section 56 (see FIG. 4) described above, and searches the initial image acquired in step S114 for reference shape R1, and searches the initial image acquired in step S118 for reference shape R2. Thereafter, control circuit 151 transforms the position of reference shape R1 represented by a coordinate system of camera 338 view into position "xA" represented by a world coordinate system on the basis of a predetermined coordinate transformation formula. Similarly, control circuit 151 transforms the position of reference shape R2 represented by a coordinate system of camera 338 view into position "xB" represented by a world coordinate system on the basis of a predetermined coordinate transformation formula. Positions "xA", "xB" are written into control parameter 173A (see FIG. 10).

In step S122, control circuit 151 receives a setting input of position of machine tool 400 on the basis of positions "xA", "xB". Position of machine tool 400 in step S122 is, for example, manually input. The position is represented by a distance from position "xA" to each machine tool 400. The distance is written into control parameter 173A (see FIG. 10).

M. CORRECTING FLOW OF CONTROL PARAMETER 173

Figure 21:
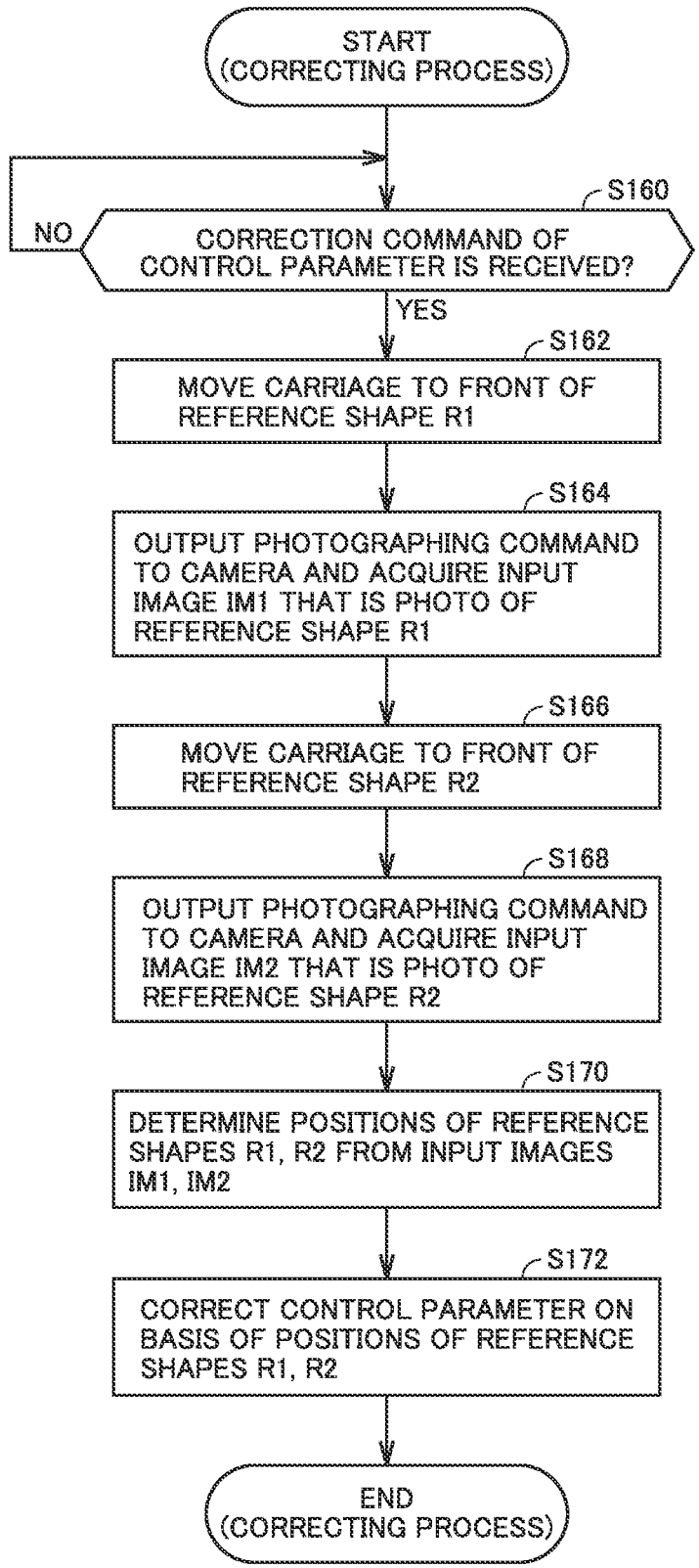
FIG. 21 is a flowchart showing a flow of a correcting process of control parameter.

Next, referring to FIG. 21, a flow of a correcting process of control parameter 173 is described. FIG. 21 is a flowchart showing a flow of a correcting process of control parameter 173.

The correcting process shown in FIG. 21 is executed, for example, at a predetermined timing when the length of rail 331 changes after execution of the initial setting process shown in FIG. 20. The process shown in FIG. 21 is realized, for example, by executing control program 172 (see FIG. 11) described above by control circuit 151 of PLC 150. In other aspect, part or the whole of the process may be executed by a circuit element or other hardware.

In step S160, control circuit 151 determines whether a correction command for control parameter 173 is received. As one example, a correction command for control parameter 173 is issued based on that a correction executing button on the operation screen displayed in operation terminal 200A is pressed down. As other example, a correction command for control parameter 173 is issued at a predetermined timing such as at the time of startup of transport system 10. Control circuit 151 switches the control to step S162 when it is determined that a correction command for control parameter 173 is received (YES in step S160). If it is not so (NO in step S160), control circuit 151 again executes the process in step S160.

In step S162, control circuit 151 functions as drive controlling section 52 (see FIG. 4) described above, and moves carriage 332 to the front of reference shape R1 existing in storage portion 250. A stopping position of carriage 332 in step S162 is the same as a stopping position of carriage 332 in step S112 (see FIG. 20) described above.

Thereafter, control circuit 151 drives arm robot 330 to assume a predetermined posture and makes reference shape R1 be included in a field of view of camera 338. The posture of arm robot 330 in step S162 is the same as the posture of arm robot 330 in step S112 (see FIG. 20) described above.

Carriage 332 is moved to the front of reference shape R1, and arm robot 330 assumes a predetermined posture, resulting that reference shape R1 existing in storage portion 250 is contained in a field of view of camera 338.

In step S164, control circuit 151 functions as image acquiring section 54 (see FIG. 4) described above, and outputs a photographing command to camera 338. Accordingly, control circuit 151 acquires an input image IM1 that is a photo of reference shape R1 from camera 338.

In step S166, control circuit 151 functions as drive controlling section 52 (see FIG. 4) described above, and moves carriage 332 to the front of reference shape R2 existing in storage portion 250. A stopping position of carriage 332 in step S162 is the same as a stopping position of carriage 332 in step S116 (see FIG. 20) described above.

Thereafter, control circuit 151 drives arm robot 330 to assume a predetermined posture and makes reference shape R2 be included in a field of view of camera 338. The posture of arm robot 330 in step S162 is the same as the posture of arm robot 330 in step S116 (see FIG. 20) described above.

Carriage 332 is moved to the front of reference shape R2, and arm robot 330 assumes a predetermined posture, resulting that reference shape R2 existing in storage portion 250 is contained in a field of view of camera 338.

In step S168, control circuit 151 functions as image acquiring section 54 (see FIG. 4) described above, and outputs a photographing command to camera 338. Accordingly, control circuit 151 acquires an input image IM2 that is a photo of reference shape R2 from camera 338.

In step S170, control circuit 151 functions as determining section 56 (see FIG. 4) described above, and searches input image IM1 for reference shape R1, and searches input image IM2 for reference shape R2. Thus, the position of reference shape R1 and the position of reference shape R2 are determined. Since the function of determining section 56 is as described above, the description thereof will not be repeated.

In step S172, control circuit 151 functions as correcting section 58 (see FIG. 4) described above, and corrects control parameter 173 on the basis of at least one of the position of reference shape R1 and the position of reference shape R2. Since the correcting method of control parameter 173 is as described above, the description thereof will not be repeated.

N. MODIFIED EXAMPLE OF TRANSPORT SYSTEM 10

Next, referring to FIG. 22, transport system 10 as a pallet transport system is described.

The above description was made for the case where the correcting process of control parameter 173 is applied to transport system 10 as a tool transport system, however, the above-described correcting process of control parameter 173 can be applied to any system as long as the system transports an object to be transported to any one of plural machine tools 400. As one example, the correcting process of control parameter 173 described in the present description can be applied to a pallet transport system.

FIG. 22 is a diagram showing transport system 10 as a pallet transport system. Transport system 10 as a pallet transport system includes storage portion 250, transport device 300, plurality of machine tools 400, and a work station 500.

Storage portion 250 is one of transport destinations of a pallet PL by transport device 300, and is a place for storing pallet PL. In storage portion 250, a plurality of pallets PL can be stored. Storage portion 250 stores vacant pallet PL before attachment of workpiece W, pallet PL to which workpiece W before machining is attached, pallet PL to which workpiece W being machined is attached, and pallet PL to which workpiece W after machining is attached, and the like.

Transport device 300 transports designated pallet PL to a designated place. More specifically, transport device 300 includes rail 331 and carriage 332. Carriage 332 has a fork mechanism (not shown) that is configured to be driven in a direction orthogonal to rail 331 (namely, the direction orthogonal to the traveling direction of carriage 332). Carriage 332 moves along rail 331 to the position of pallet PL to be transported, and places pallet PL to be transported on carriage 332 by using the fork mechanism. Thereafter, carriage 332 moves along rail 331 to a designated transport destination (for example, machine tool 400), and carries pallet PL to be transported into the transport destination using the fork mechanism.

Machine tool 400 is one of transport destinations of pallet PL by transport device 300. Machine tool 400 machines a workpiece attached to carried-in pallet PL according to a preliminarily designed machining program. Upon completion of machining of the workpiece, pallet PL in machine tool 400 is transported to storage portion 250 or work station 500 by transport device 300.

Work station 500 is one of transport destinations of pallet PL by transport device 300. Work station 500 is a work area for an operator to perform various operations for carried-in pallet PL. In work station 500, an operator carries out a work of attaching a workpiece to be machined to carried-in pallet PL, a work of detaching the workpiece having completed machining from pallet PL, cleaning of the work area and so on. Upon completion of the works for pallet PL, the operator performs an operation for indicating completion of works. Based on this, pallet PL in work station 500 is transported to storage portion 250 or machine tool 400 by transport device 300.

As described above, an object to be transported by transport system 10 is not limited to a tool for machining a workpiece, but may be a pallet to which a workpiece can be attached. Also, in a pallet transport system, length of rail 331 can change by changes in environment such as temperature, humidity and the like. Therefore, the above-described correcting process of control parameter 173 is also applicable to the pallet transport system.

O. CONCLUSION

In the manner as described above, transport system 10 corrects a control parameter to be used in transporting an object to be transported stored in storage portion 250 to machine tool 400 on the basis of the positions of reference shapes R1, R2 existing in storage portion 250. As a result, transport system 10 is capable of transporting an object to be transported to machine tool 400 securely even when the length of rail 331 changes.

It is to be understood that the embodiments disclosed herein are illustrative, but are not restrictive in every respect. The scope of the present invention is indicated by the appended claims rather than by the description described above, and it is intended that all modifications within the equivalent meaning and scope of the claims are included.

REFERENCE SIGNS LIST

10: transport system, 50: control unit, 52: drive controlling section, 54: image acquiring section, 56: determining section, 58: correcting section, 61 to 63: remote I/O unit, 100: management device, 101, 151, 201: control circuit, 102, 152, 202: ROM, 103, 153, 203: RAM, 104, 154, 155, 204: communication interface, 105, 205: display interface, 106, 206: display, 107, 207: input interface, 108, 208: input device, 110, 160, 210: bus, 120, 170, 220: storage device, 122: tool management program, 124: schedule information, 172, 222: control program, 173, 173A to 173D: control parameter, 174: tool information, 200: tool setup device, 200A: operation terminal, 234, 234A, 234B, 334, 334A, 334B, 411, 411A, 411B: motor driver, 235, 235A, 235B, 335, 335A, 335B, 335C, 335D, 335E, 412, 412A, 412B: motor, 238, 438: ATC, 250, 250A: storage portion, 300: transport device, 330: arm robot, 331: rail, 332: carriage, 336: temporary storage place, 336A, 336B: arm, 337: pot gripper, 338: camera, 400, 400A to 400N: machine tool, 500: work station

The invention claimed is:

1. A transport system comprising:
   a transport path;
   a storage portion disposed along the transport path, the storage portion storing an object to be transported that is to be used in machining a workpiece, the storage portion having a first reference shape within a range of a predetermined distance from one end of the storage portion in a direction parallel with the transport path, and a second reference shape within a range of a predetermined distance from the other end of the storage portion in the direction parallel with the transport path;
   a plurality of machine tools;
   a transport device that moves on the transport path, and transports the object to be transported stored in the storage portion to a machine tool that is a transport destination among the plurality of machine tools, the transport device being provided with a camera; and
   a control unit that controls the transport device,
   the control unit executing
      a process of making the camera photograph the first reference shape by moving the transport device to a predetermined first position on the transport path, and acquiring a first image from the camera,
      a process of making the camera photograph the second reference shape by moving the transport device to a predetermined second position on the transport path, and acquiring a second image from the camera, and
      a process of correcting a control parameter to be used in transporting the object to be transported stored in the storage portion to the machine tool that is a transport destination on the basis of a position of the first reference shape in the first image and a position of the second reference shape in the second image.

2. The transport system according to claim 1, wherein the control parameter is a parameter regarding movement of the transport device in a direction parallel with the transport path.

3. The transport system according to claim 1, wherein the transport device includes
   a carriage that moves on the transport path, and
   a robot attached on the carriage, and
   the control parameter includes at least one of a parameter for controlling movement of the carriage and a parameter for controlling driving of the robot.

4. The transport system according to claim 1, wherein the object to be transported is a tool for machining a workpiece, or a pallet to which a workpiece can be attached.

5. A control method for a transport system,
   the transport system including
      a transport path, and
      a storage portion disposed along the transport path, the storage portion storing an object to be transported that is to be used in machining a workpiece, the storage portion having a first reference shape within a range of a predetermined distance from one end of the storage portion in a direction parallel with the transport path, and a second reference shape within a range of a predetermined distance from the other end of the storage portion in the direction parallel with the transport path,
   the transport system further including
      a plurality of machine tools, and
      a transport device that moves on the transport path, and transports the object to be transported stored in the storage portion to a machine tool that is a transport destination among the plurality of machine tools, the transport device being provided with a camera,
   the control method comprising:
      making the camera photograph the first reference shape by moving the transport device to a predetermined first position on the transport path, and acquiring a first image from the camera;
      making the camera photograph the second reference shape by moving the transport device to a predetermined second position on the transport path, and acquiring a second image from the camera; and
      correcting a control parameter to be used in transporting the object to be transported stored in the storage portion to the machine tool that is a transport destination on the basis of a position of the first reference shape in the first image and a position of the second reference shape in the second image.

6. A non-transitory computer-readable medium comprising a control program for a transport system,
   the transport system including
      a transport path, and
      a storage portion disposed along the transport path, the storage portion storing an object to be transported that is to be used in machining a workpiece, the storage portion having a first reference shape within a range of a predetermined distance from one end of the storage portion in a direction parallel with the transport path, and a second reference shape within a range of a predetermined distance from the other end of the storage portion in the direction parallel with the transport path,
   the transport system further including
      a plurality of machine tools, and
      a transport device that moves on the transport path, and transports the object to be transported stored in the storage portion to a machine tool that is a transport destination among the plurality of machine tools, the transport device being provided with a camera,
   the control program causing the transport system to execute:
      making the camera photograph the first reference shape by moving the transport device to a predetermined first position on the transport path, and acquiring a first image from the camera;
      making the camera photograph the second reference shape by moving the transport device to a predetermined second position on the transport path, and acquiring a second image from the camera; and
      correcting a control parameter to be used in transporting the object to be transported stored in the storage portion to the machine tool that is a transport destination on the basis of a position of the first reference shape in the first image and a position of the second reference shape in the second image.

* * * * *